US010465114B2

(12) United States Patent
Junge et al.

(10) Patent No.: US 10,465,114 B2
(45) Date of Patent: Nov. 5, 2019

(54) LIQUID-CRYSTALLINE MEDIUM

(71) Applicant: MERCK PATENT GMBH, Darmstadt (DE)

(72) Inventors: Michael Junge, Pfungstadt (DE); Andreas Beyer, Hanau (DE); Ursula Patwal, Reinheim/ Georgenhausen (DE); Peer Kirsch, Seeheim-Jugenheim (DE); Susann Beck, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 14/651,773

(22) PCT Filed: Nov. 15, 2013

(86) PCT No.: PCT/EP2013/003455
§ 371 (c)(1),
(2) Date: Jun. 12, 2015

(87) PCT Pub. No.: WO2014/090367
PCT Pub. Date: Jun. 19, 2014

(65) Prior Publication Data
US 2015/0315473 A1 Nov. 5, 2015

Related U.S. Application Data

(60) Provisional application No. 61/739,280, filed on Dec. 19, 2012.

(30) Foreign Application Priority Data

Dec. 13, 2012 (EP) .................................... 12008319

(51) Int. Cl.
*C09K 19/30* (2006.01)
*C09K 19/60* (2006.01)
*G02F 1/137* (2006.01)

(52) U.S. Cl.
CPC ...... *C09K 19/3001* (2013.01); *C09K 19/3003* (2013.01); *C09K 19/3068* (2013.01); *C09K 19/60* (2013.01); *C09K 19/606* (2013.01); *G02F 1/13737* (2013.01); *G02F 1/13762* (2013.01); *C09K 2019/3009* (2013.01); *C09K 2019/3016* (2013.01); *C09K 2019/3019* (2013.01); *C09K 2019/3021* (2013.01); *C09K 2019/3025* (2013.01); *C09K 2019/3078* (2013.01); *C09K 2019/3083* (2013.01)

(58) Field of Classification Search
None
See application file for complete search history.

(56) References Cited

U.S. PATENT DOCUMENTS

| 4,378,302 | A | 3/1983 | Aftergut | |
|---|---|---|---|---|
| 4,555,355 | A * | 11/1985 | Yamada | C09B 3/14 |
| | | | | 252/299.1 |
| 4,935,160 | A | 6/1990 | Scheuble | |
| 5,280,373 | A | 1/1994 | Ozawa et al. | |
| 5,350,535 | A | 9/1994 | Rieger | |
| 5,840,208 | A * | 11/1998 | Yamaguchi | C09K 19/50 |
| | | | | 252/299.63 |
| 5,858,271 | A | 1/1999 | Sekiguchi et al. | |
| 6,887,532 | B2 | 5/2005 | Okabe | |
| 7,857,991 | B2 | 12/2010 | Shiga et al. | |
| 8,057,867 | B2 | 11/2011 | Yanai | |
| 9,164,314 | B2 | 10/2015 | Van Oosten | |
| 2004/0108488 | A1* | 6/2004 | Okabe | C09K 19/42 |
| | | | | 252/299.63 |
| 2004/0135117 | A1* | 7/2004 | Liu | C07D 285/135 |
| | | | | 252/299.1 |
| 2009/0033861 | A1 | 2/2009 | Shiga et al. | |
| 2011/0062384 | A1 | 3/2011 | Yanai et al. | |
| 2014/0333985 | A1 | 11/2014 | Junge et al. | |

FOREIGN PATENT DOCUMENTS

| CH | 678947 A5 | 11/1991 | |
|---|---|---|---|
| CN | 101712874 A | 5/2010 | |
| DE | 4111992 A1 | 10/1992 | |
| EP | 47027 A1 | 3/1982 | |
| EP | 0460436 B1 | 3/1997 | |
| EP | 824141 B1 | 6/2001 | |
| JP | 57063377 A | 4/1982 | |
| JP | 59166580 A | 9/1984 | |
| JP | 2004723 A | 1/1990 | |
| JP | 5025478 A2 | 2/1993 | |
| JP | 5500682 T2 | 2/1993 | |
| JP | 5173114 A2 | 7/1993 | |
| JP | 6322369 A | 11/1994 | |
| JP | 8231960 A | 9/1996 | |
| JP | 9241642 A2 | 9/1997 | |
| JP | 9302346 A | 11/1997 | |
| JP | 10060442 A | 3/1998 | |
| JP | 10111523 A | 4/1998 | |
| JP | H10-111534 A | 4/1998 | |
| JP | 2000-313881 A | 11/2000 | |
| JP | 2004182883 A | 7/2004 | |
| JP | 2005154724 A | 6/2005 | |
| JP | 2009046525 A | 3/2009 | |
| JP | 2010208861 A | 9/2010 | |
| JP | 2011084730 A | 4/2011 | |
| WO | 9729167 A1 | 8/1997 | |
| WO | WO-2009141295 A1 * | 11/2009 | ........... C09K 19/588 |
| WO | 12010536 A1 | 1/2012 | |
| WO | 2013097919 A1 | 7/2013 | |

OTHER PUBLICATIONS

International Search Report for PCT/EP2013/003455 dated Mar. 7, 2014.

(Continued)

*Primary Examiner* — Chanceity N Robinson
*Assistant Examiner* — Anna Malloy
(74) *Attorney, Agent, or Firm* — Millen White Zelano and Branigan, PC; John Sopp

(57) ABSTRACT

A liquid-crystalline medium which is suitable for use in a guest-host system. An LC device, preferably a device for the regulation of the passage of energy, containing the liquid-crystalline medium.

11 Claims, No Drawings

(56) References Cited

OTHER PUBLICATIONS

English Abstract for CH678947, Publication Date: Nov. 29, 1991.
First Office Action in corresponding Japan Application 2015-546881 dated Nov. 6, 2017.
Office Action in corresponding EP Application 13792262.1 dated Jul. 26, 2018.
Office Action in corresponding JP Application 2015-546881 dated Jul. 9, 2018.
Office Action in corresponding Japan Application 2015-546881 dated Apr. 3, 2018.
Notice of Reexamination in corresponding CN Appln. 201380064681.0 dispatched Feb. 14, 2019 (pp. 1-9).
"Applications of Liquid Crystals and Displays", East China College of Chemical Industry, 1st edition Jan. 1993, pp. 188-194.
"Organic Dye Chemistry and Technology", China Petrochemical Press, 1st edition Jun. 2002, pp. 99-100.
Office Action in corresponding JP Appln. 2015-546881 dispatched Feb. 20, 2019 (pp. 1-2).

\* cited by examiner

LIQUID-CRYSTALLINE MEDIUM

The present application relates to a liquid-crystalline medium of defined composition which comprises one or more dichroic dyes. The liquid-crystalline medium is suitable for use in LC devices of the guest-host type, for example those which are employed for the regulation of the passage of energy through light-transmitting areas.

For the purposes of the present application, an LC device of the guest-host type is taken to mean a switchable device which comprises a switchable layer comprising a liquid-crystalline medium, where the liquid-crystalline medium comprises one or more dichroic dyes. Devices of the guest-host type were developed for the first time by Heilmeier and Zanoni (G. H. Heilmeier et al., Appl. Phys. Lett., 1968, 13, 91) and have been used many times since then, in particular in display devices.

For LC devices of the guest-host type, in addition to the use in display devices, the use in switching devices for the regulation of the passage of energy is also known, for example from WO 2009/141295 and WO 2010/118422.

An LC device in general is taken to mean a device which has at least one layer comprising a liquid-crystalline medium. The layer is preferably a switchable layer, particularly preferably an electrically switchable layer.

For the purposes of the present application, the term liquid-crystalline medium is taken to mean a material which has liquid-crystalline properties under certain conditions. The material preferably has liquid-crystalline properties at room temperature and in a certain temperature range above and below room temperature. It is preferably nematic liquid-crystalline.

For the purposes of the present application, a dichroic dye is taken to mean a light-absorbent compound in which the absorption properties are dependent on the alignment of the compound to the polarisation direction of the light.

The prior art discloses the use of liquid-crystalline mixtures comprising cyanobiphenyl derivatives and one or more dichroic dyes. The compounds are employed in LC devices of the guest-host type (WO 2009/141295 and WO 2010/118422).

The prior art furthermore discloses the use of liquid-crystalline mixtures comprising one or more tricyclic compounds having two or more fluorine substituents and one or more dichroic dyes. The compounds are employed in LC devices of the guest-host type (U.S. Pat. Nos. 6,033,598 and 5,762,824).

However, there continues to be interest in novel liquid-crystalline mixtures comprising one or more dichroic dyes. In particular, there is a demand for mixtures in which dichroic dyes are readily soluble and remain in solution in the long term. In particular, there continues to be a demand for mixtures which are stable to light and electric fields in the long term. There also continues to be a demand for mixtures in which dichroic dyes have a high degree of anisotropy, i.e. are well aligned with the molecules of the liquid-crystalline mixture. There also continues to be a demand for mixtures having a high clearing point and high low-temperature stability.

Surprisingly, it has been found that a liquid-crystalline medium comprising at least one bicyclic cyano compound, at least one tricyclic compound having at least two fluorine substituents, at least one tetra- or polycyclic compound and at least one dichroic dye achieves the present technical object.

The term bicyclic, tricyclic and polycyclic is taken to mean that the compound has two, three or a greater number of rings. The rings can be aro-matic, heteroaromatic, aliphatic or heteroaliphatic.

The liquid-crystalline medium according to the invention has excellent solubility for dichroic dyes, where the dyes remain in solution in the long term. Furthermore, the liquid-crystalline medium according to the invention is highly light-stable and stable to electric fields. Again furthermore, the liquid-crystalline medium according to the invention has the property that dichroic dyes have a high degree of anisotropy therein. Again furthermore, the medium according to the invention has a high clearing point, preferably a clearing point greater than 80° C., particularly preferably greater than 90° C., very particularly preferably greater than 100° C. Again furthermore, the liquid-crystalline medium according to the invention has high low-temperature stability. High low-temperature stability is taken to mean, in particular, that the mixture can be stored for several months, both as is and also in an LC device, at temperatures below 0° C., preferably below −20° C., without crystallisation or phase conversion, for example into a smectic phase, occurring.

The present application thus relates to a liquid-crystalline medium comprising at least one compound of a formula (I)

formula (I)

at least one compound of a formula (II)

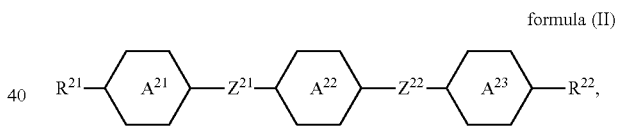

formula (II)

at least one compound of a formula (III)

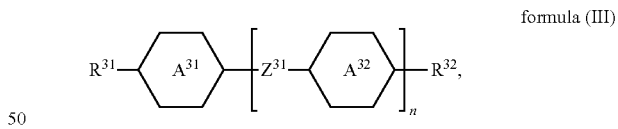

formula (III)

and at least one dichroic dye,
where the following applies to the variable groups and indices:
$R^{11}$, $R^{21}$, $R^{22}$, $R^{31}$, $R^{32}$ are on each occurrence, identically or differently, H, F, Cl, CN, NCS, $R^1$—O—CO—, $R^1$—CO—O—, an alkyl, alkoxy or thioalkoxy group having 1 to 10 C atoms, or an alkenyl, alkenyloxy or thioalkenyloxy group having 2 to 10 C atoms, where one or more H atoms in the above-mentioned groups may be replaced by F, Cl or CN, and where one or more $CH_2$ groups in the above-mentioned groups may be replaced by O, S, —O—CO— or —CO—O—,
$R^1$ is on each occurrence, identically or differently, an alkyl group having 1 to 10 C atoms, in which one or more hydrogen atoms may be replaced by F or Cl, and in which one or more $CH_2$ groups may be replaced by O or S, $Z^{11}$, $Z^{21}$, $Z^{22}$, $Z^{31}$ are selected on each occurrence, identically or differently, from —CO—O—, —O—CO—, —CF$_2$—CF$_2$—, —CF$_2$—O—, —O—CF$_2$—, —CH$_2$—CH$_2$—, —CH=CH—, —CF=CF—, —CF=CH—, —CH=CF—, —C≡C—, —OCH$_2$—, —CH$_2$O— and a single bond, and $A^{11}$ is selected from

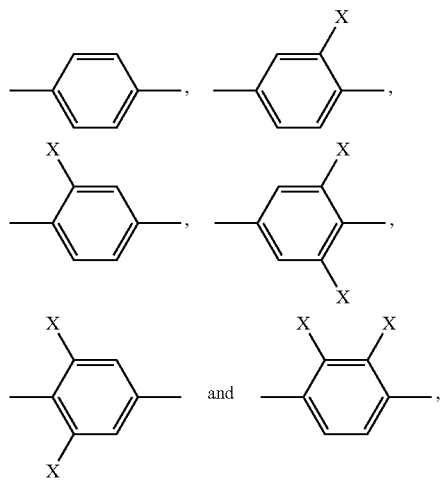

$A^{21}$, $A^{22}$, $A^{23}$, $A^{31}$, $A^{32}$ are selected on each occurrence, identically or differently, from

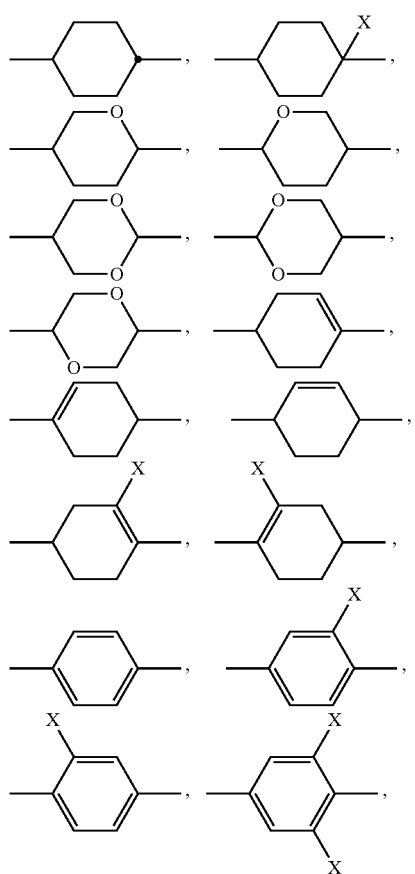

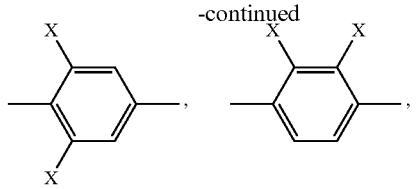

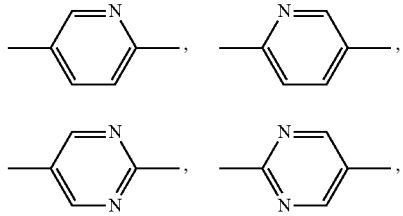

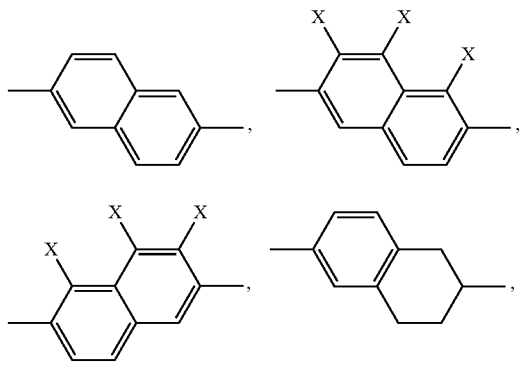

X is selected on each occurrence, identically or differently, from F, Cl, CN or an alkyl, alkoxy or alkylthio group having 1 to 10 C atoms, where one or more hydrogen atoms in the above-mentioned groups may be replaced by F or Cl, and where one or more CH$_2$ groups in the above-mentioned groups may be replaced by O or S, and n is 3, 4 or 5; and where the compound of the formula (II) carries at least two fluorine substituents.

The units

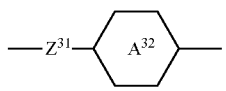

here may be identical or different on each occurrence.

The rings

for example

are abbreviated to "A$^{xx}$", for example "A$^{11}$", in the present application in order to improve legibility in continuous text.

The liquid-crystalline medium according to the invention preferably comprises 10-60% by weight of compounds of the formula (I), particularly preferably 20-50% by weight, very particularly preferably 25-40% by weight.

The liquid-crystalline medium according to the invention furthermore preferably, and preferably in combination with the above-mentioned preferred proportion of the compounds of the formula (I), comprises 20-60% by weight of compounds of the formula (II), preferably 30-50% by weight.

The medium according to the invention furthermore preferably, and preferably in combination with the above-mentioned preferred proportion of the compounds of the formula (I) and/or of the formula (II), comprises 15-45% by weight of compounds of the formula (III), preferably 25-35% by weight.

Compounds of the formula (III) are preferably present in the medium in a proportion of at least 6% by weight, preferably at least 9% by weight and particularly preferably at least 12% by weight.

The medium according to the invention particularly preferably comprises one or more compounds of the formula (I-1) defined below and one or more compounds of the formula (II-1-1) or (II-1-2) defined below, preferably in the proportions indicated above for compounds of the formulae (I) and (II), respectively.

It is furthermore preferred for the medium according to the invention that the ratio of the proportions of compounds of the formula (I) to compounds of the formula (II) is between 1:0.9 and 1:5, particularly preferably between 1:1 and 1:2 and very particularly preferably between 1:1.05 and 1:1.6, where the proportions are indicated in % by weight.

The medium according to the invention is furthermore preferably a nematic liquid-crystalline mixture.

The medium according to the invention furthermore preferably has a clearing point, preferably a phase transition from a nematic liquid-crystalline state to an isotropic state, in the temperature range from 70° C. to 170° C., preferably from 90° C. to 160° C., particularly preferably from 105° C. to 150° C. and very particularly preferably from 110° C. to 140° C.

Furthermore, the dielectric anisotropy of the medium according to the invention is preferably greater than 3, particularly preferably greater than 7.

It is generally preferred for the medium to comprise no compounds containing one or more groups selected from

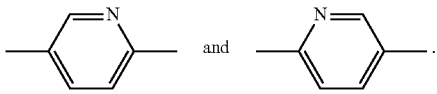

It is furthermore generally preferred for the medium to comprise no compounds containing benzoic acid ester groups. It particularly preferably comprises no compounds containing one or more bridging groups Z selected from —CO—O— and —O—CO—.

The liquid-crystalline medium according to the invention furthermore preferably comprises 3 to 20 different liquid-crystalline compounds, preferably 8 to 18, particularly preferably 12 to 16 different liquid-crystalline compounds.

Compounds of the formula (I) are preferably characterised in that

R$^{11}$ is H, F, CN, an alkyl or alkoxy group having 1 to 10 C atoms or an alkenyl group having 2 to 10 C atoms, where one or more H atoms in the above-mentioned groups may be replaced by F, Cl or CN, and/or Z$^{11}$ is a single bond, and/or A$^{11}$ is selected from

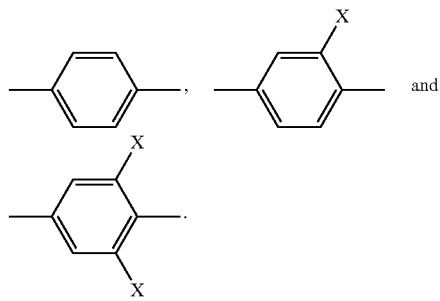

Compounds of the formula (I) particularly preferably conform to the following formula (I-1):

formula (I-1)

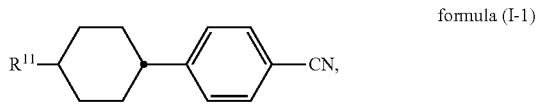

where

R$^{11}$ is selected from H, F, CN, an alkyl or alkoxy group having 1 to 10 C atoms, where one or more H atoms in the above-mentioned groups may be replaced by F, Cl or CN, and where R$^{11}$ is preferably selected from alkyl groups having 1 to 10 C atoms, particularly preferably from alkyl groups having 3 to 8 C atoms.

The following compounds are examples of compounds of the formula (I):

CP-2-N

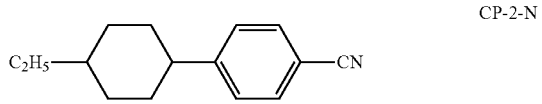

CP-3-N

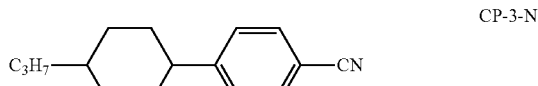

CP-4-N

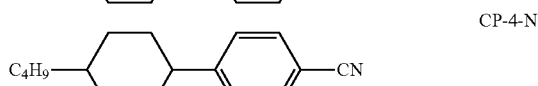

CP-5-N

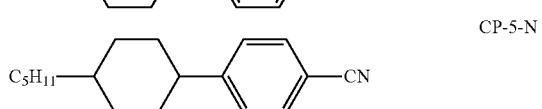

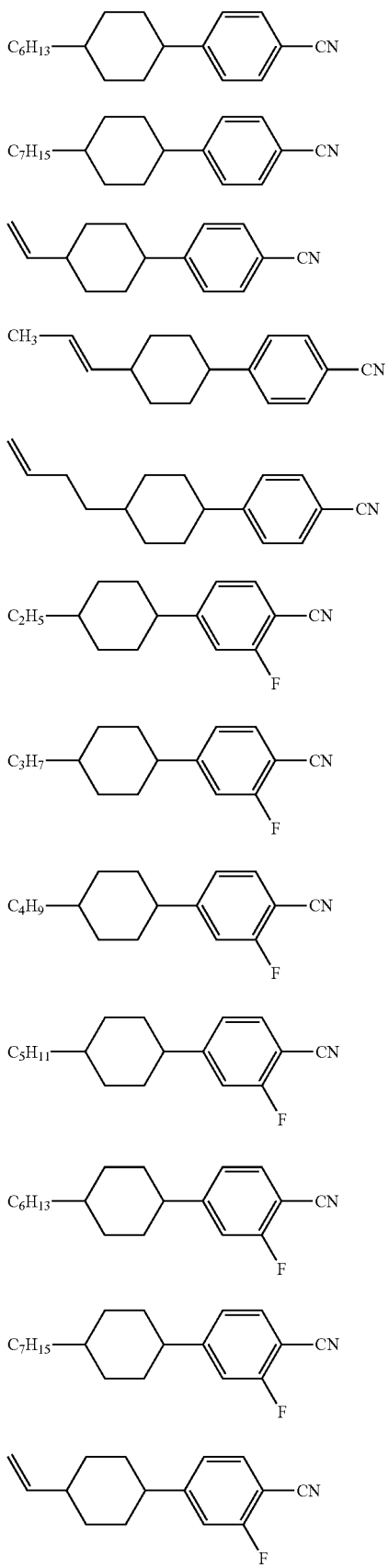
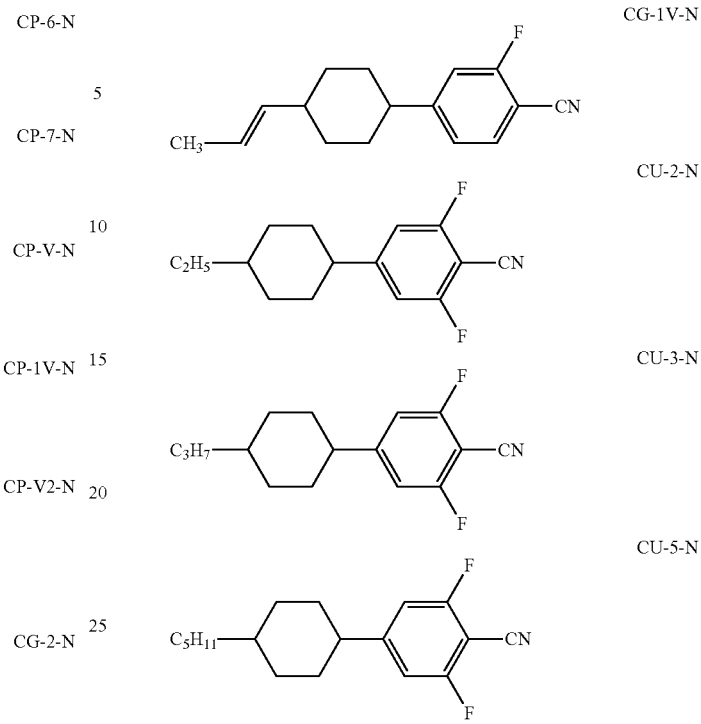

Compounds of the formula (II) preferably have exactly 2 to 5 fluorine substituents, particularly preferably exactly 2 or 3 fluorine substituents. Preferably, at least two fluorine substituents are a constituent of the group $A^{23}$.

Compounds of the formula (II) are preferably characterised in that $Z^{21}$ and/or $Z^{22}$ are single bonds. $Z^{21}$ and $Z^{22}$ are preferably single bonds.

It is furthermore preferred for $R^{21}$ to be selected from H, F, CN, an alkyl or alkoxy group having 1 to 10 C atoms, where one or more H atoms in the above-mentioned groups may be replaced by F, Cl or CN. $R^{21}$ is particularly preferably selected from alkyl groups having 1 to 10 C atoms, particularly preferably from alkyl groups having 3 to 8 C atoms.

It is furthermore preferred for $R^{22}$ to be selected from H, F, alkyl groups having 1 to 10 C atoms and alkoxy groups having 1 to 10 C atoms, where one or more H atoms in the alkyl and alkoxy groups may be replaced by F.

$R^{22}$ is particularly preferably selected from H, F and OCF$_3$. $R^{22}$ is very particularly preferably equal to F.

It is furthermore preferred for $A^{21}$ to be selected from

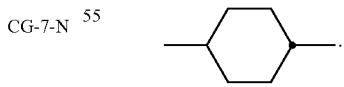

It is again furthermore preferred for $A^{22}$ to be selected from

It is again furthermore preferred for $A^{23}$ to be selected from

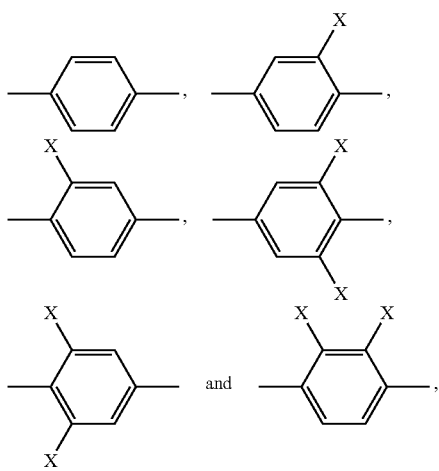

where X is defined as above.

$A^{23}$ is particularly preferably selected from

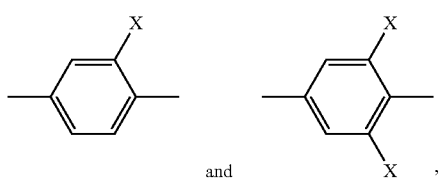

where X is defined as above.

In groups $A^{23}$, X is preferably equal to F.

A preferred embodiment of the compound of the formula (II) is a compound of the following formula (II-1):

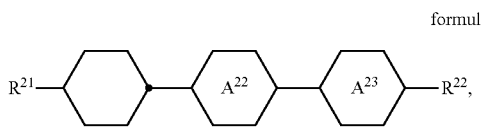
formula (II-1)

where the groups occurring are as defined above.

In the compound of the formula (II-1), preferably $A^{22}$ is selected from

and/or $A^{23}$ is selected from

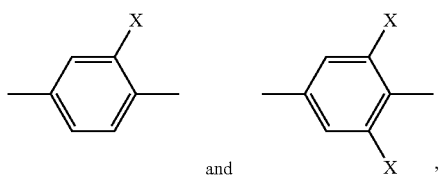

where X is defined as above, and/or $R^{21}$ is selected from alkyl groups having 1 to 10 C atoms, preferably alkyl groups having 3 to 8 C atoms, and/or $R^{22}$ is selected from H, F and $OCF_3$.

A compound of the formula (II) is particularly preferably a compound of the following formula (II-1-1) or (II-1-2):

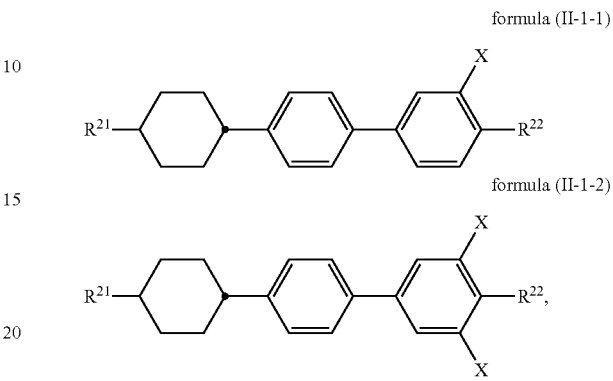
formula (II-1-1)

formula (II-1-2)

where $R^{21}$, $R^{22}$ and X are as defined above.

In compounds of the formulae (II-1-1) and (II-1-2), preferably $R^{21}$ is an alkyl group having 1 to 10 C atoms, preferably 3 to 8 C atoms, and/or $R^{22}$ is H, F or $OCF_3$, and/or X is equal to F.

The following compounds are examples of compounds of the formula (II):

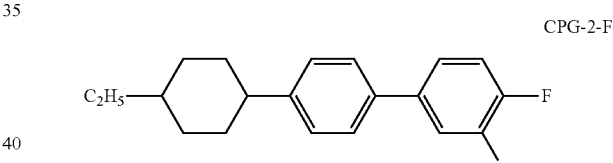
CPG-2-F

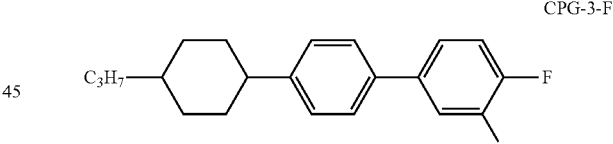
CPG-3-F

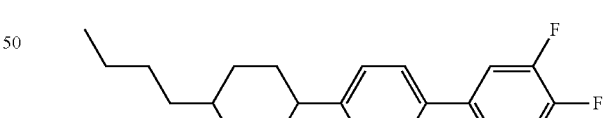
CPG-4-F

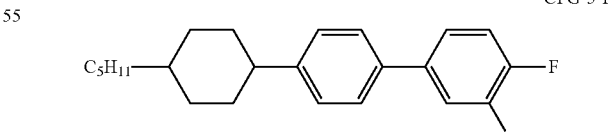
CPG-5-F

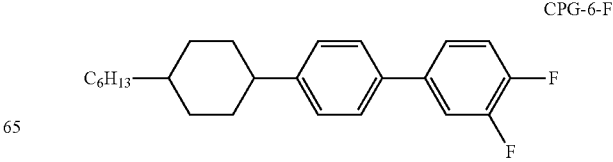
CPG-6-F

CPG-7-F

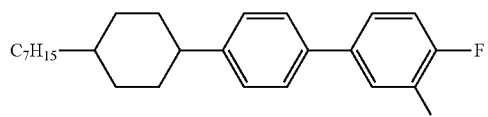

CPU-2-F

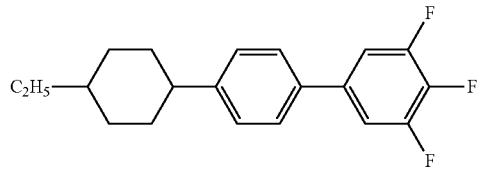

CPU-3-F

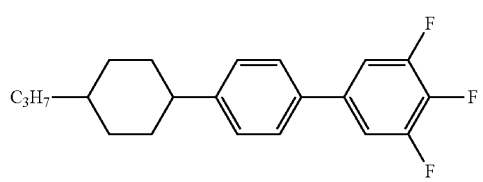

CPU-4-F

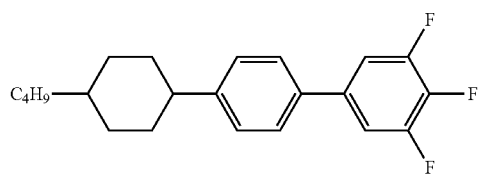

CPU-5-F

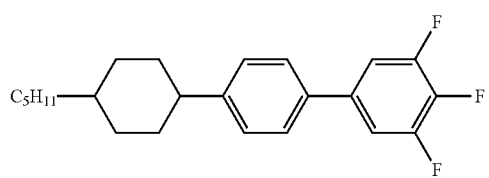

CPU-6F

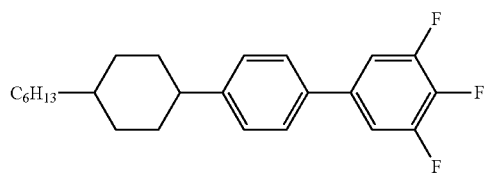

CPU-7-F

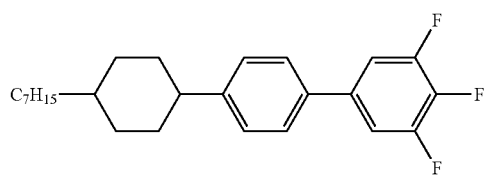

CGU-3-F

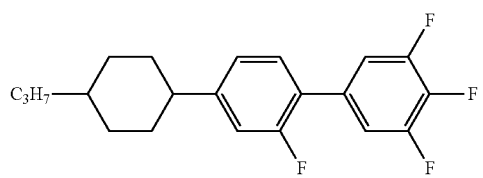

CGU-5-F

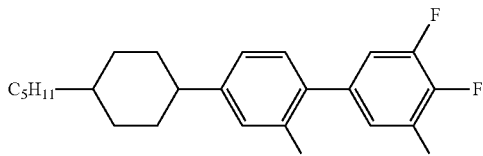

CPU-3-OT

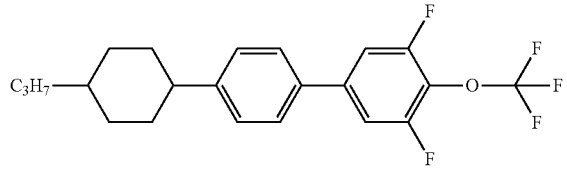

CPG-3-OT

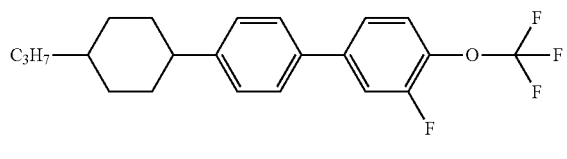

The index n in compounds of the formula (III) is preferably equal to 3 or 4, particularly preferably equal to 3.

Furthermore, $A^{31}$ in formula (III) is preferably selected from

Again furthermore, $Z^{31}$ in formula (III) is selected on each occurrence, identically or differently, from a single bond or —CO—O—.

Again furthermore, $A^{32}$ in formula (III) is selected on each occurrence, identically or differently, from

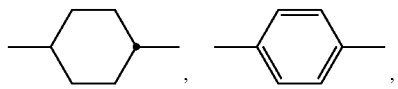

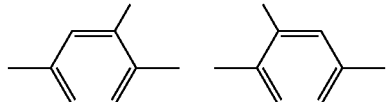

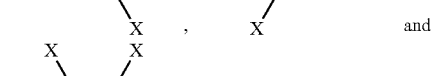 and

, where X is as defined above.

$A^{32}$ in formula (III) is particularly preferably selected on each occurrence, identically or differently, from

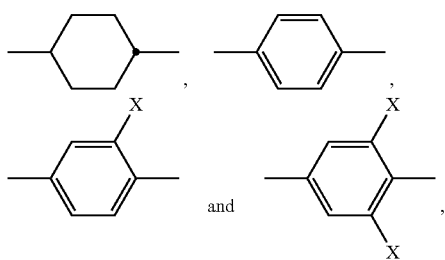

where X is as defined above.

X in compounds of the formula (III) is preferably equal to F.

R$^{31}$ in compounds of the formula (III) is preferably an alkyl group having 1 to 10 C atoms.

R$^{32}$ in compounds of the formula (III) is preferably selected from H, F and an alkyl group having 1 to 10 C atoms.

Compounds of the formula (III) preferably conform to one of the formulae (III-1) to (III-2) indicated below:

formula (III-1)

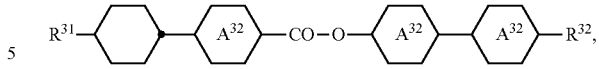

formua (III-2)

where R$^{31}$, R$^{32}$ and A$^{32}$ are as defined above.

In formulae (III-1) and (III-2), preferably R$^{31}$ is selected from alkyl groups having 1 to 10 C atoms, and/or R$^{32}$ is selected from H, F, CN, OCF$_3$, and alkyl groups having 1 to 10 C atoms, and/or A$^{32}$ is selected on each occurrence from

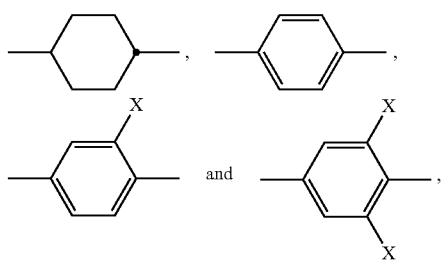

where X is as defined above and where X is preferably equal to F.

The following compounds are examples of compounds of the formula (III):

CPPC-3-3

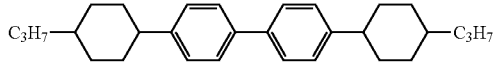

CPPC-3-5

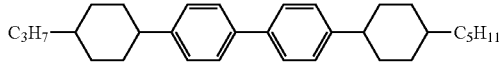

CPPC-5-5

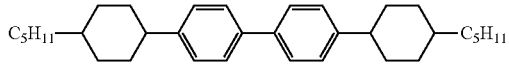

CPGP-3-2

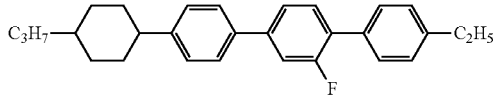

CPGP-5-2

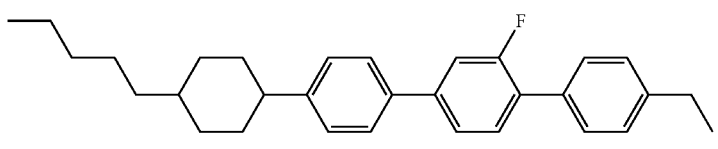

CPGP-5-4

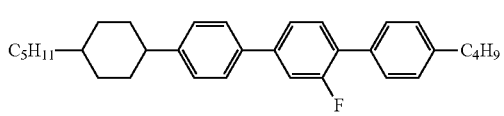

CCGU-3-F

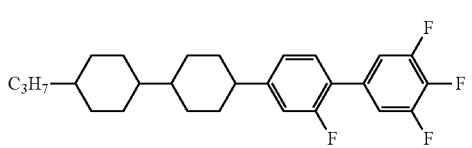

CPGU-3-OT

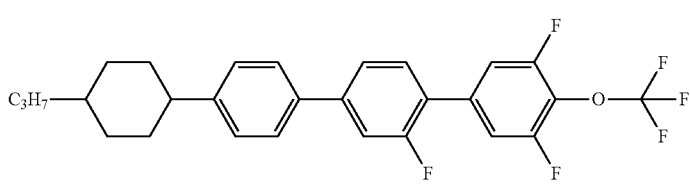

CGPC-3-3

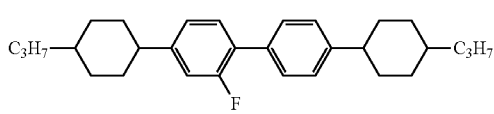

CGPC-5-3

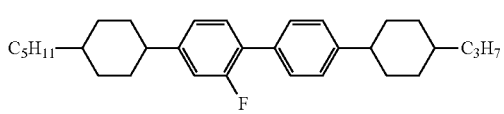

-continued

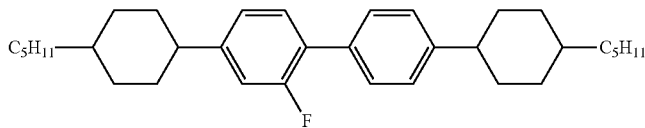

CGPC-5-5

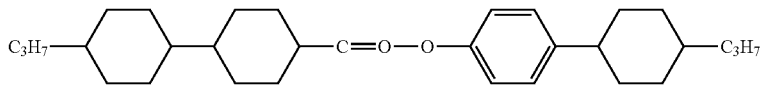

CCZPC-3-3

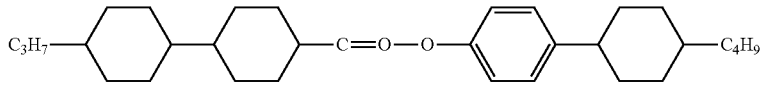

CCZPC-3-4

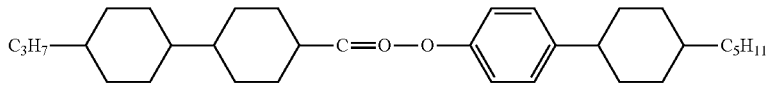

CCZPC-3-5

The liquid-crystalline medium according to the invention comprises one or more dichroic dyes. It preferably comprises at least two, particularly preferably at least three and very particularly preferably three or four different dichroic dyes. The at least two dichroic dyes preferably each cover different regions of the light spectrum.

If two or more dichroic dyes are present in the liquid-crystalline medium according to the invention, the absorption spectra of the dichroic dyes preferably complement one another in such a way that essentially the entire visible spectrum of light is absorbed. This results in the impression of a black colour for the human eye. This is preferably achieved by using three or more dichroic dyes, at least one of which absorbs blue light, at least one of which absorbs green to yellow light, and at least one of which absorbs red light. The light colour here is determined in accordance with B. Bahadur, Liquid Crystals—Applications and Uses, Vol. 3, 1992, World Scientific Publishing, Section 11.2.1. It is pointed out that the perceived colour of the dye in each case represents the complementary colour to the absorbed colour, i.e. a dye which absorbs blue light has a yellow colour.

The proportion of the dichroic dye or dichroic dyes in the liquid-crystalline medium according to the invention is preferably in total 0.01 to 10% by weight, particularly preferably 0.1 to 7% by weight and very particularly preferably 0.2 to 7% by weight. The proportion of an individual dichroic dye is preferably 0.01 to 10% by weight, preferably 0.05 to 7% by weight and very particularly preferably 0.1 to 7% by weight.

It is preferred in accordance with the invention for the liquid-crystalline medium according to the invention to comprise one or more chiral dopants. In this case, the molecules of the liquid-crystalline medium are preferably twisted with respect to one another in the LC device of the guest-host type, particularly preferably as known from the TN mode of displays.

According to an alternative, likewise preferred embodiment, the liquid-crystalline medium according to the invention comprises no chiral dopants. In this case, the molecules of the liquid-crystalline medium are preferably not twisted with respect to one another in the LC device of the guest-host type. In this case, the LC device is particularly preferably in antiparallel mode.

Chiral dopants are preferably used in the liquid-crystalline medium according to the invention in a total concentration of 0.01% to 3%, particularly preferably 0.05% to 1%. In order to obtain high values for the twist, the total concentration of the chiral dopants may also be selected higher than 3%, preferably up to a maximum of 10%.

The proportions of these compounds and other components present in small amounts are neglected when specifying the proportions of the liquid-crystalline compounds and dichroic dyes.

Preferred dopants are the compounds depicted in the following table:

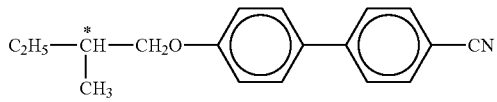

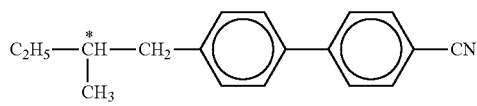

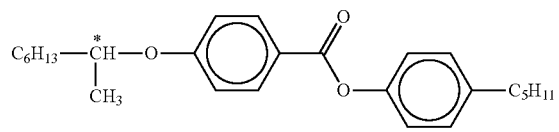

-continued
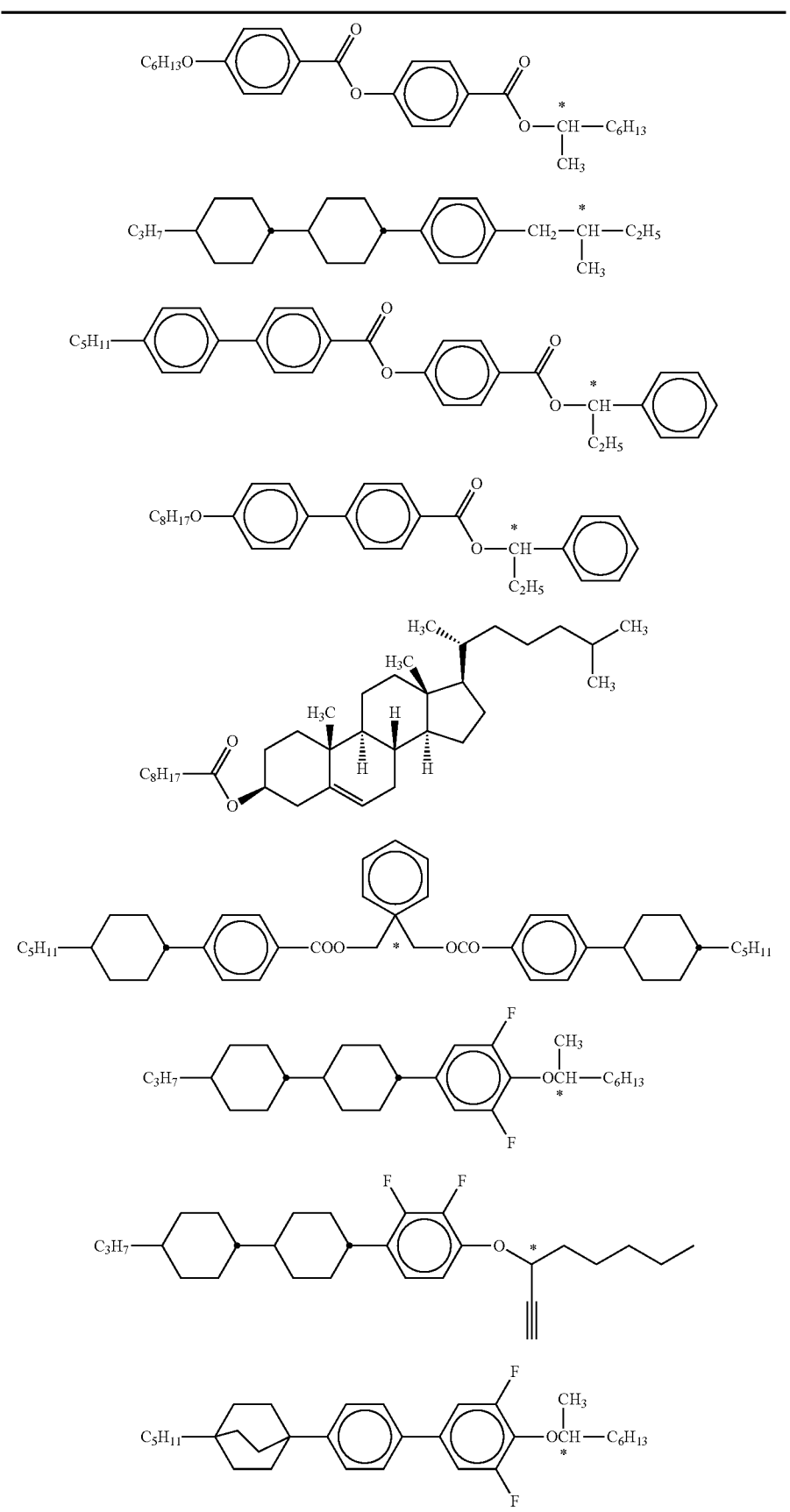

-continued

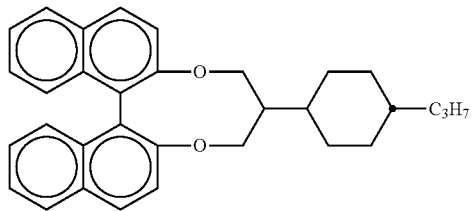

The liquid-crystalline medium according to the invention furthermore preferably comprises one or more stabilisers. The total concentration of the stabilisers is preferably between 0.00001% and 10%, particularly preferably between 0.0001% and 1% of the mixture as a whole. The proportions of these compounds and other components present in small amounts are neglected when specifying the proportions of the liquid-crystalline compounds and dichroic dyes.

Preferred stabiliser compounds are shown in the following table:

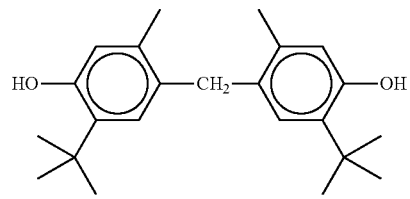

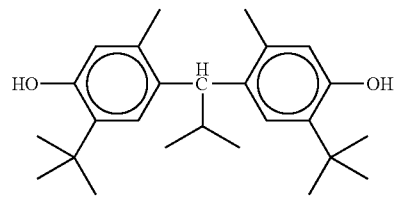

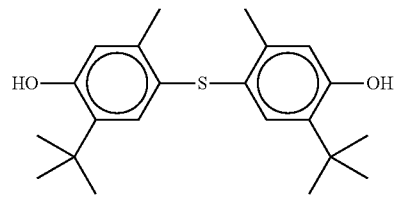

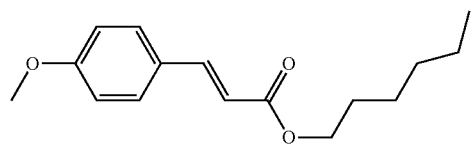

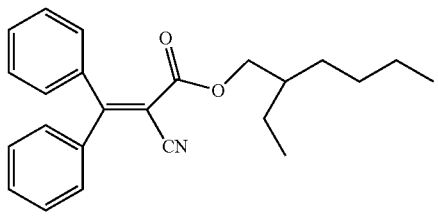 [SMILES: CCCCC(CC)COC(=O)C(C#N)=C(c1ccccc1)c1ccccc1]

-continued
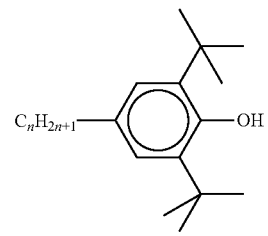
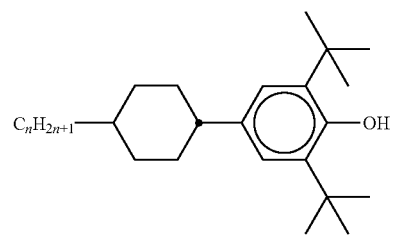
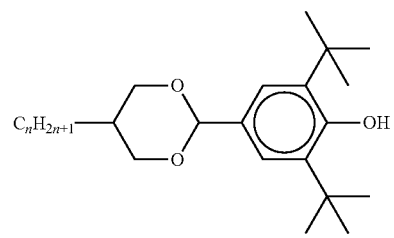
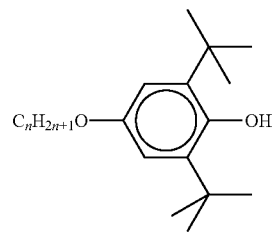
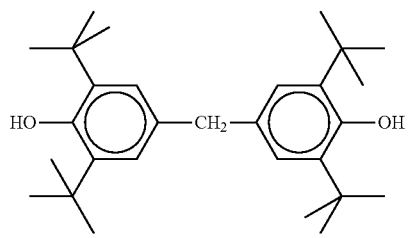
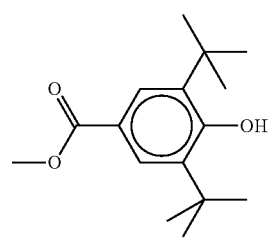

-continued
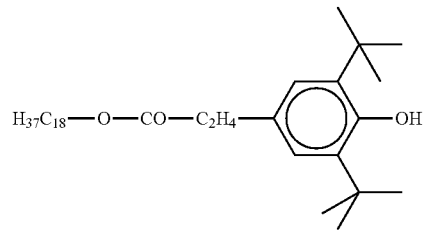
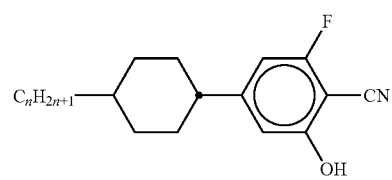
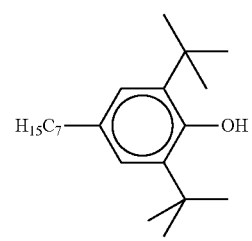
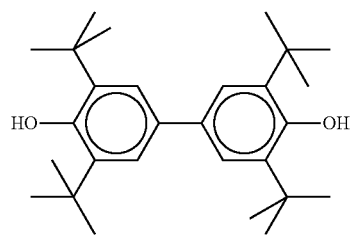
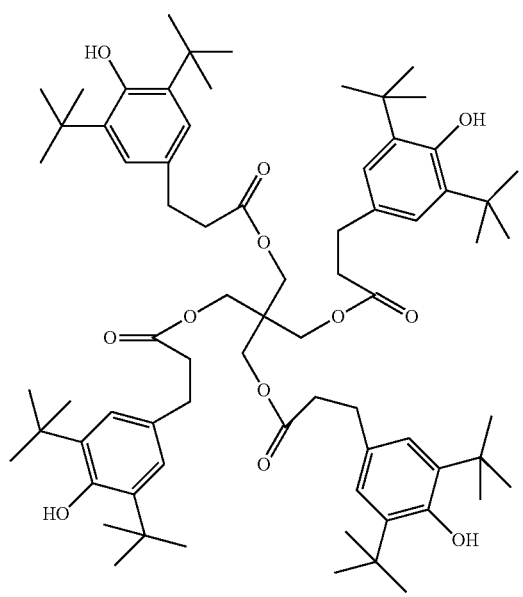 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]

-continued
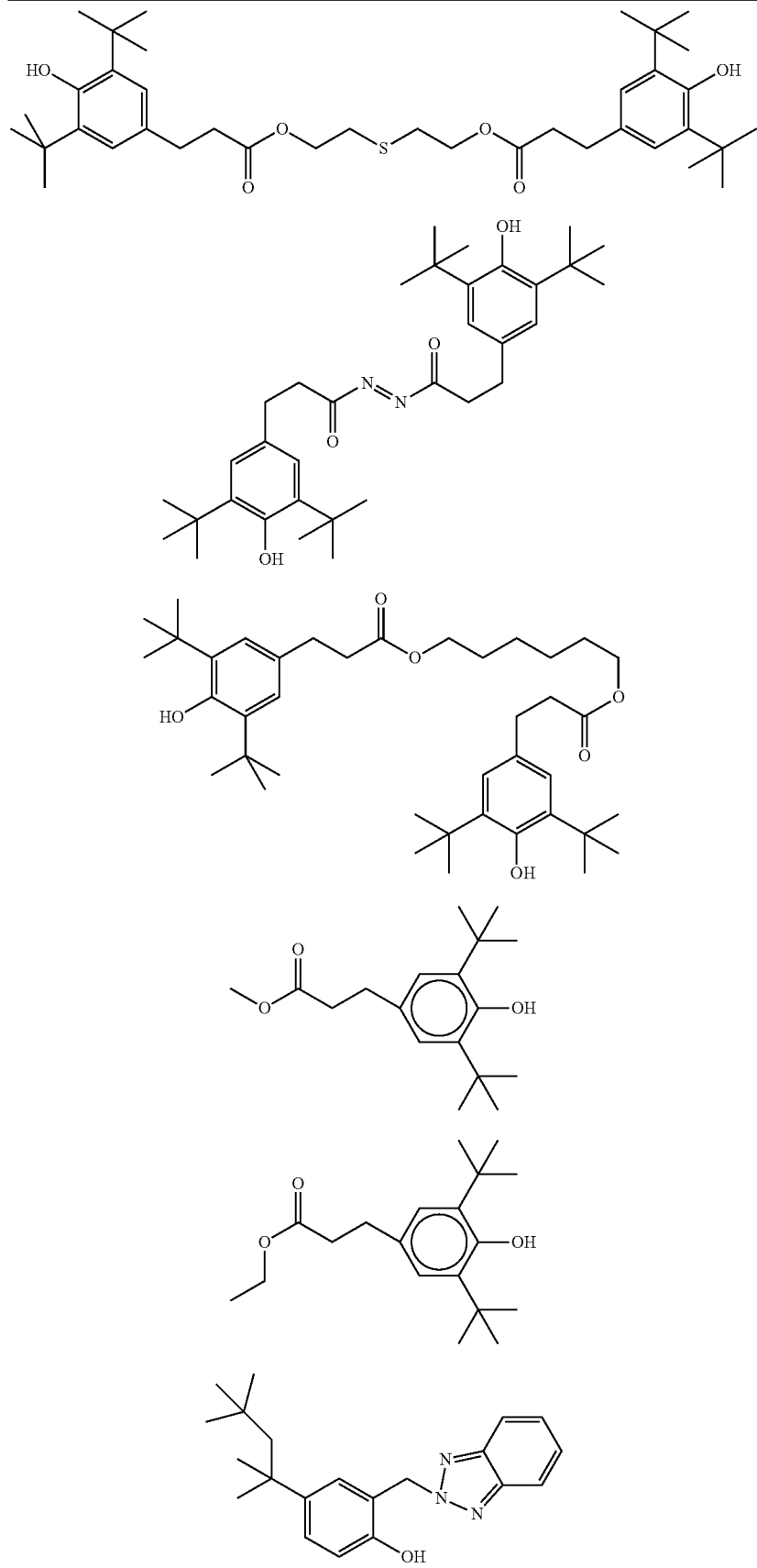

-continued
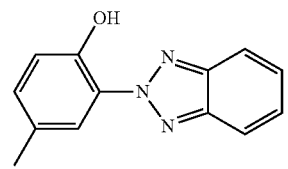 [SMILES: Cc1ccc(O)c(-n2nc3ccccc3n2)c1]
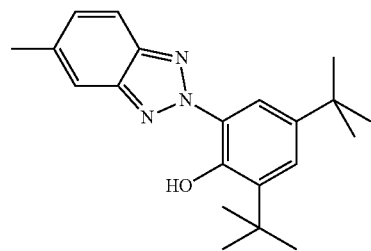 [SMILES: Cc1ccc2nn(-c3cc(C(C)(C)C)cc(C(C)(C)C)c3O)nc2c1]
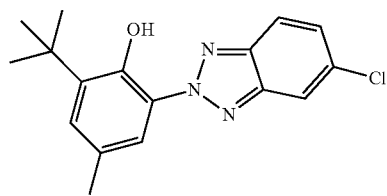 [SMILES: Cc1cc(-n2nc3ccc(Cl)cc3n2)c(O)c(C(C)(C)C)c1]
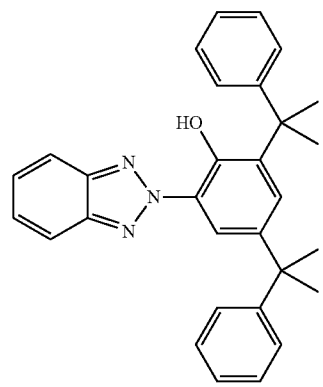 [SMILES: CC(C)(c1ccccc1)c1cc(-n2nc3ccccc3n2)c(O)c(C(C)(C)c2ccccc2)c1]
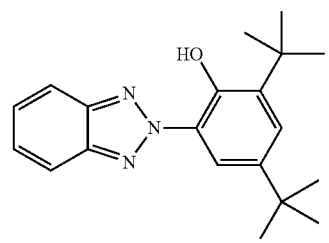 [SMILES: CC(C)(C)c1cc(-n2nc3ccccc3n2)c(O)c(C(C)(C)C)c1]
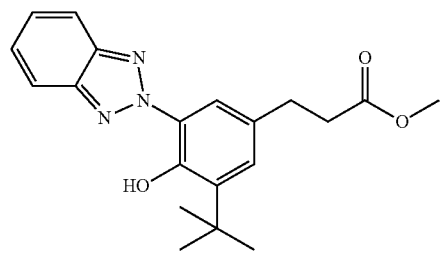 [SMILES: COC(=O)CCc1cc(-n2nc3ccccc3n2)c(O)c(C(C)(C)C)c1]

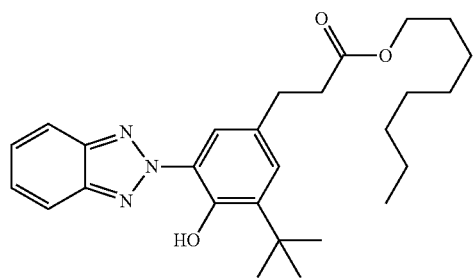 [SMILES: CCCCCCCCOC(=O)CCc1cc(-n2nc3ccccc3n2)c(O)c(C(C)(C)C)c1]
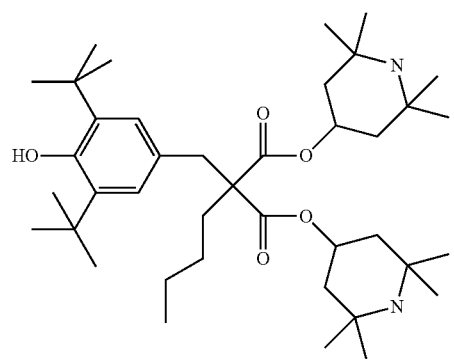 [SMILES: CCCCC(Cc1cc(C(C)(C)C)c(O)c(C(C)(C)C)c1)(C(=O)OC1CC(C)(C)NC(C)(C)C1)C(=O)OC1CC(C)(C)NC(C)(C)C1]
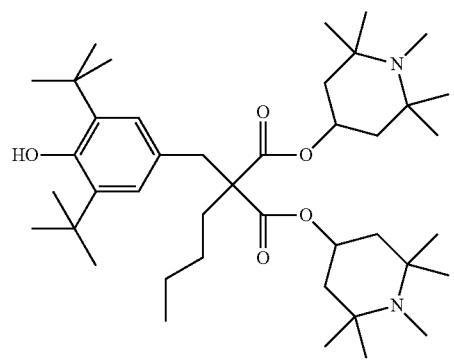 [SMILES: CCCCC(Cc1cc(C(C)(C)C)c(O)c(C(C)(C)C)c1)(C(=O)OC1CC(C)(C)N(C)C(C)(C)C1)C(=O)OC1CC(C)(C)N(C)C(C)(C)C1]
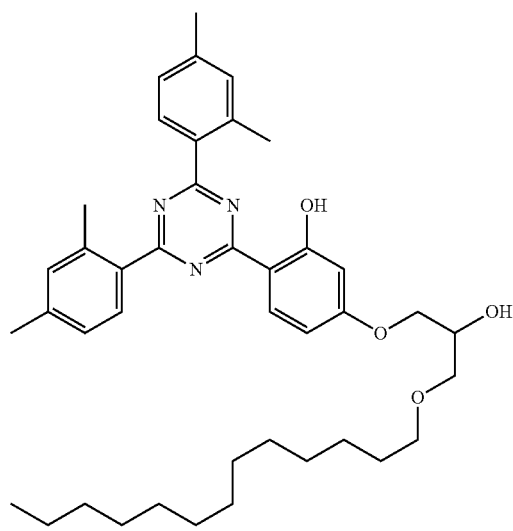 [SMILES: CCCCCCCCCCCCCOCC(O)COc1ccc(-c2nc(-c3ccc(C)cc3C)nc(-c3ccc(C)cc3C)n2)c(O)c1]

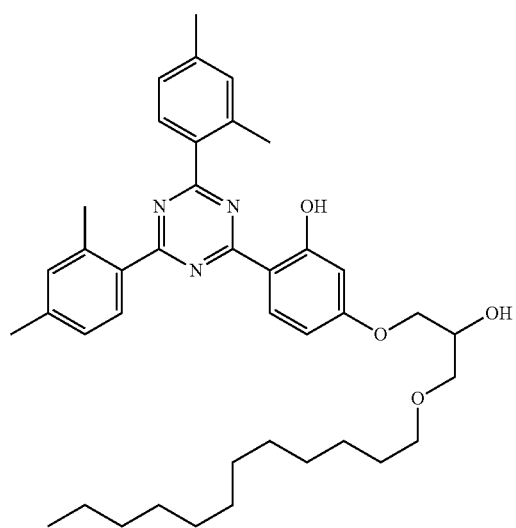 [SMILES: CCCCCCCCCCCCOCC(O)COc1ccc(-c2nc(-c3ccc(C)cc3C)nc(-c3ccc(C)cc3C)n2)c(O)c1]
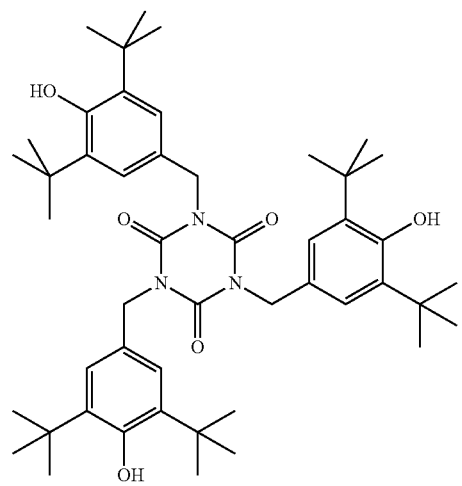 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
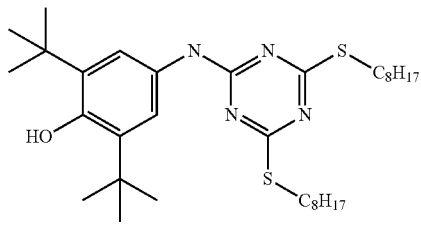
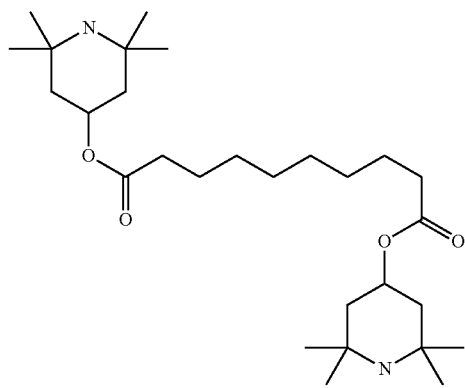

-continued
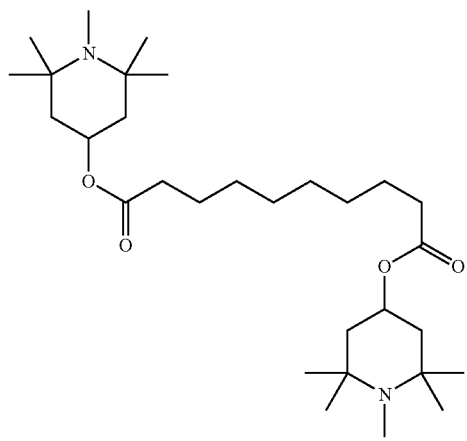
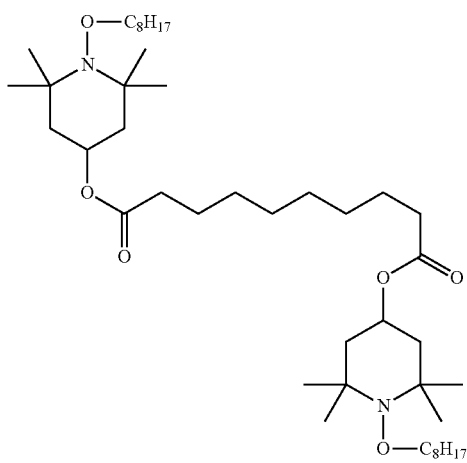
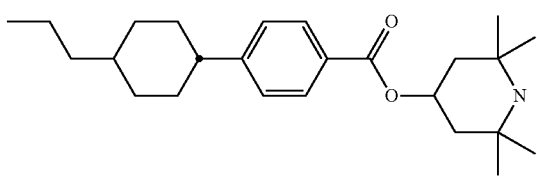
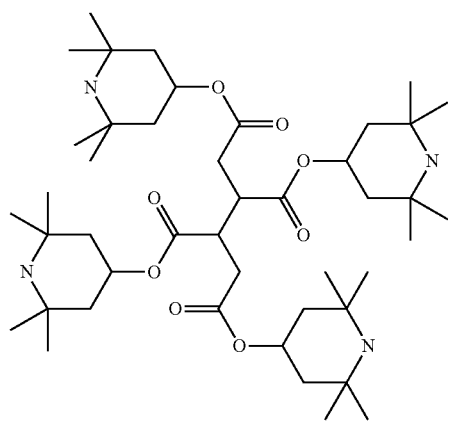

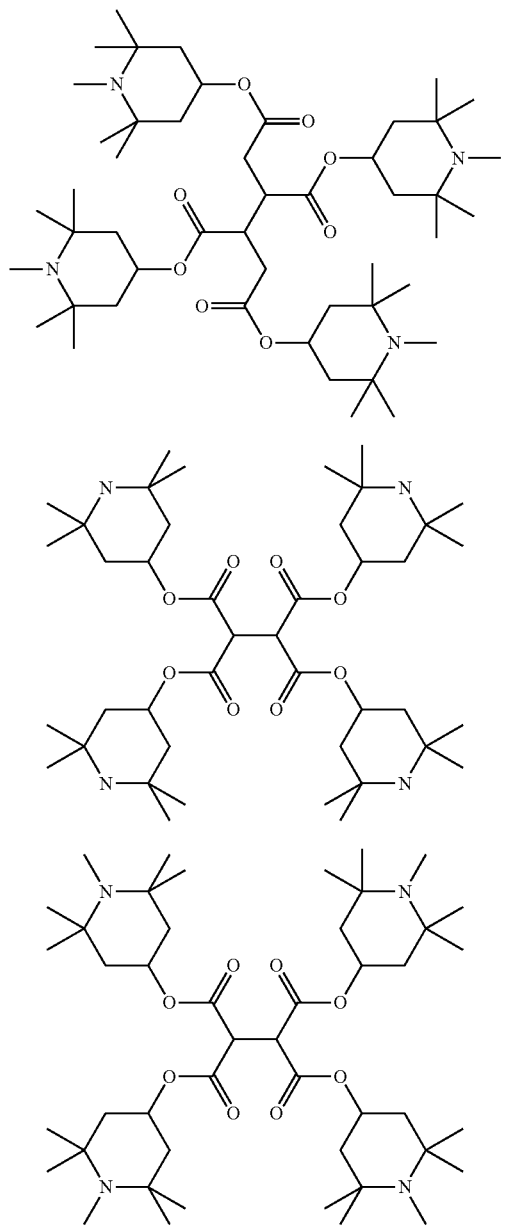

The dichroic dye of the liquid-crystalline medium according to the invention is preferably dissolved in the liquid-crystalline medium. It is preferably influenced in its alignment by the alignment of the compounds of the liquid-crystalline medium.

The dichroic dye of the liquid-crystalline medium according to the invention is preferably a positively dichroic dye, i.e. a dye which has a positive degree of anisotropy R, determined as indicated in the working examples. The degree of anisotropy R is particularly preferably greater than 0.4, very particularly preferably greater than 0.5 and most preferably greater than 0.6, where R is determined as indicated in the working examples.

The absorption preferably reaches a maximum when the polarisation direction of the light is parallel to the direction of the longest elongation of the molecule and reaches a minimum when the polarisation direction of the light is perpendicular to the direction of the longest elongation of the molecule.

The dichroic dye in accordance with the present application preferably absorbs predominantly light in the UV-VIS-NIR region, i.e. in a wavelength range from 320 to 2000 nm. UV light here denotes light having a wavelength of 320 to 380 nm, VIS light denotes light having a wavelength of 380 to 780 nm, and NIR light denotes light having a wavelength of 780 to 2000 nm.

The dichroic dye of the liquid-crystalline medium according to the invention is furthermore preferably a fluorescent dye.

Fluorescence here is taken to mean that a compound is placed in an electronically excited state by absorption of light having a certain wavelength, where the compound subsequently undergoes a transition to the ground state with emission of light. The emitted light preferably has a longer wavelength than the absorbed light. The transition from the excited state to the ground state is furthermore preferably spin-allowed, i.e. takes place without a change in the spin. The lifetime of the excited state of the fluorescent compound is furthermore preferably shorter than $10^{-5}$ s, particularly preferably shorter than $10^{-6}$ s, very particularly preferably between $10^{-9}$ and $10^{-7}$ s.

The dichroic dye of the liquid-crystalline medium is furthermore preferably an organic compound, particularly preferably an organic compound containing at least one condensed aryl or heteroaryl group.

The dichroic dye is furthermore preferably selected from the dye classes indicated in B. Bahadur, Liquid Crystals—Applications and Uses, Vol. 3, 1992, World Scientific Publishing, Section 11.2.1 and particularly preferably from the compounds explicitly mentioned in the table.

The dichroic dye is preferably selected from azo compounds, anthraquinones, methine compounds, azomethine compounds, merocyanine compounds, naphthoquinones, tetrazines, perylenes, terrylenes, quaterrylenes, higher rylenes, and pyrromethenes. Of these, particular preference is given to perylenes, terrylenes, and quaterrylenes.

The said dyes belong to the classes of dichroic dyes which are known to the person skilled in the art and have been described in the literature.

Thus, for example, anthraquinone dyes are described in EP 34832, EP 44893, EP 48583, EP 54217, EP 56492, EP 59036, GB 2065158, GB 2065695, GB 2081736, GB 2082196, GB 2094822, GB 2094825, JP-A 55-123673, DE 3017877, DE 3040102, DE 3115147, DE 3115762, DE 3150803 and DE 3201120, naphthoquinone dyes are described in DE 3126108 and DE 3202761, azo dyes are described in EP 43904, DE 3123519, WO 82/2054, GB 2079770, JP-A 56-57850, JP-A 56-104984, U.S. Pat. Nos. 4,308,161, 4,308,162, 4,340,973, T. Uchida, C. Shishido, H. Seki and M. Wada: Mol. Cryst. Lig. Cryst. 39, 39-52 (1977) and H. Seki, C. Shishido, S. Yasui and T. Uchida: Jpn. J. Appl. Phys. 21, 191-192 (1982), and perylenes are described in EP 60895, EP 68427 and WO 82/1191.

Particular preference is given to anthraquinone dyes, azo dyes and naphthoquinone dyes, as disclosed in detail, for example, in DE 3307238, and rylene dyes, as disclosed, for example, in EP 2166040, US 2011/0042651, EP 68427, EP 47027, EP 60895, DE 3110960 and EP 698649.

Examples of preferred dichroic dyes are depicted in the following table:

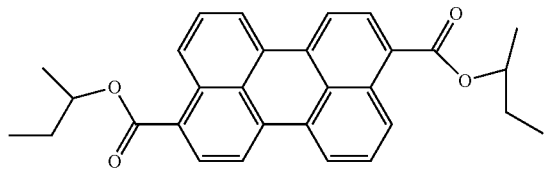 [SMILES: CCC(C)OC(=O)c1ccc2c3cccc4c(C(=O)OC(C)CC)ccc(c5cccc1c52)c43]

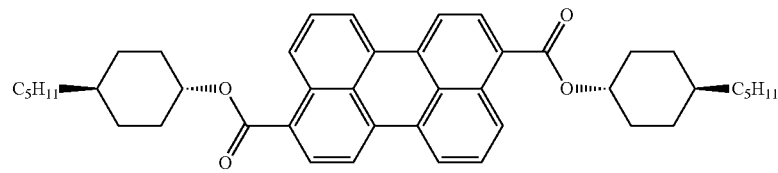

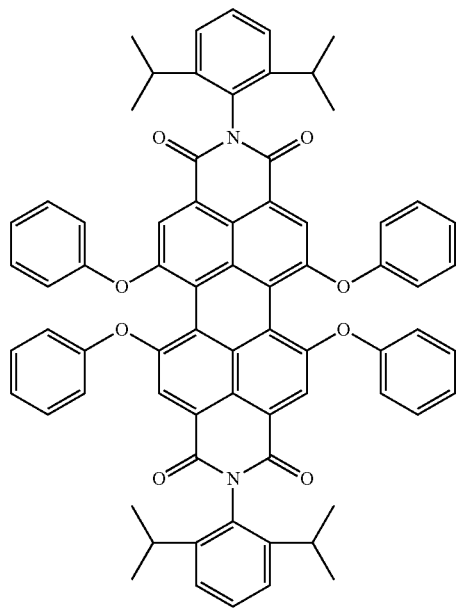 [SMILES: CC(C)c1cccc(C(C)C)c1N1C(=O)c2cc(Oc3ccccc3)c3c4c(Oc5ccccc5)cc5c6c(cc(Oc7ccccc7)c(c7c(Oc8ccccc8)cc(c2c37)C1=O)c64)C(=O)N(c1c(C(C)C)cccc1C(C)C)C5=O]

-continued
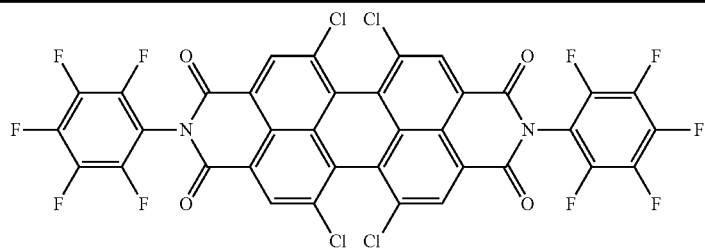
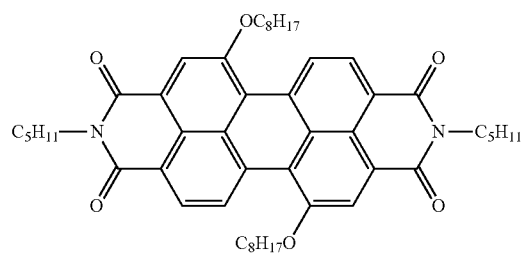
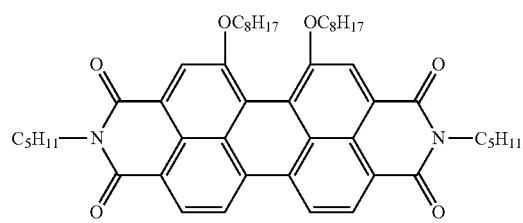
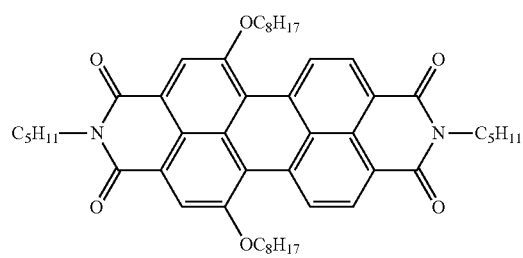
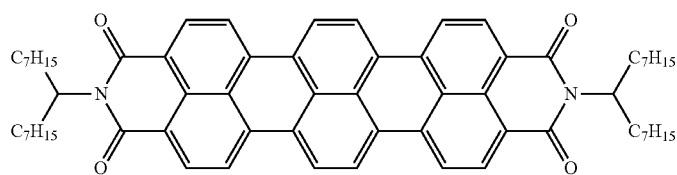

-continued
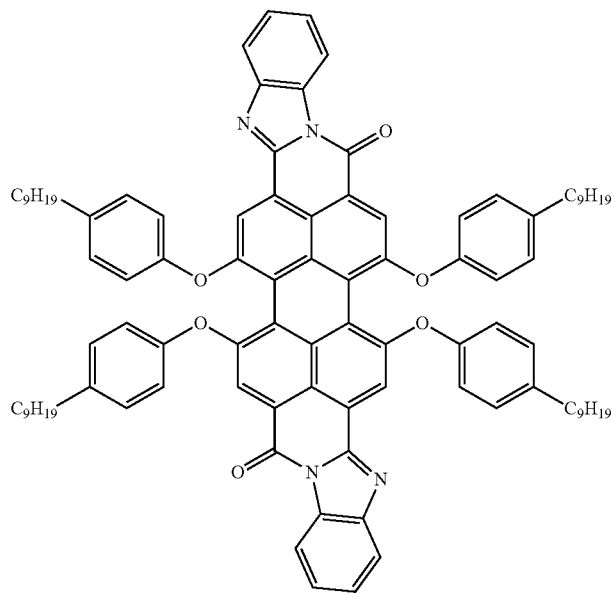
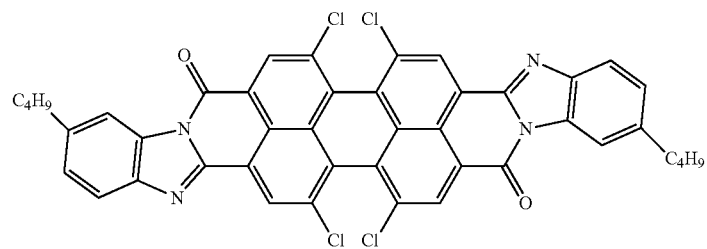
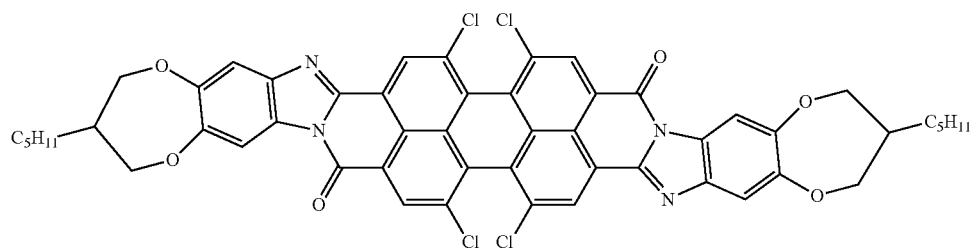
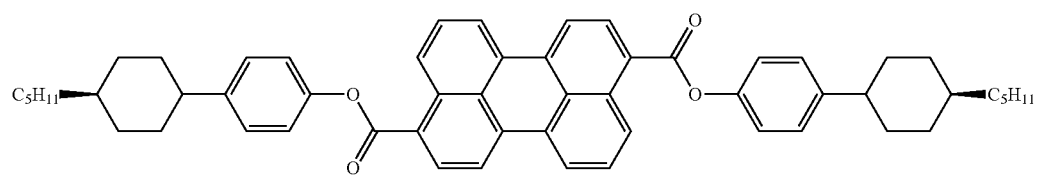
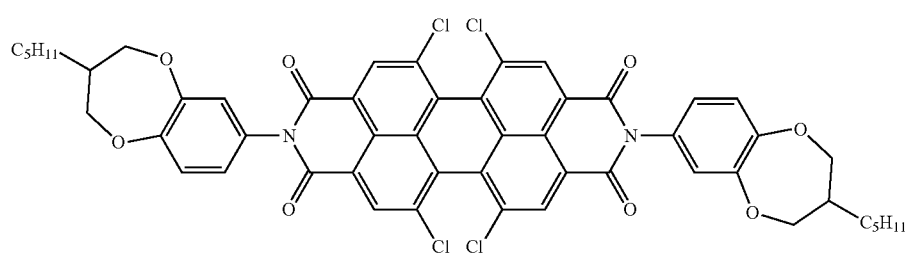

-continued
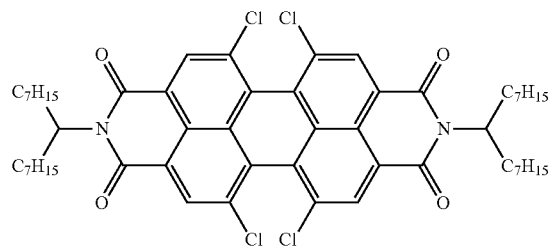
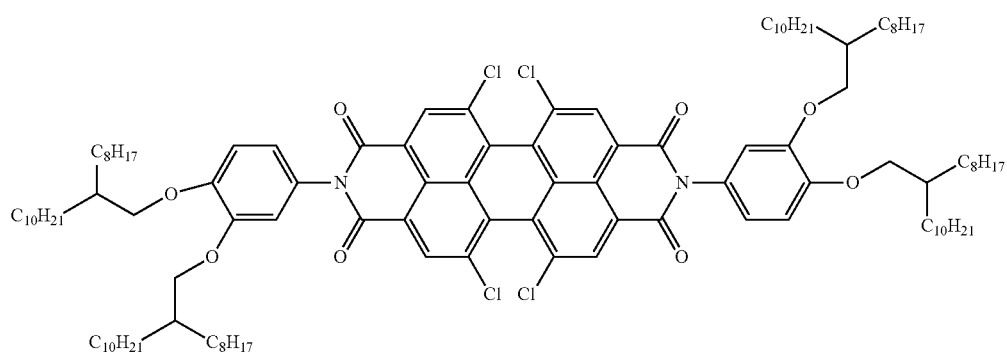
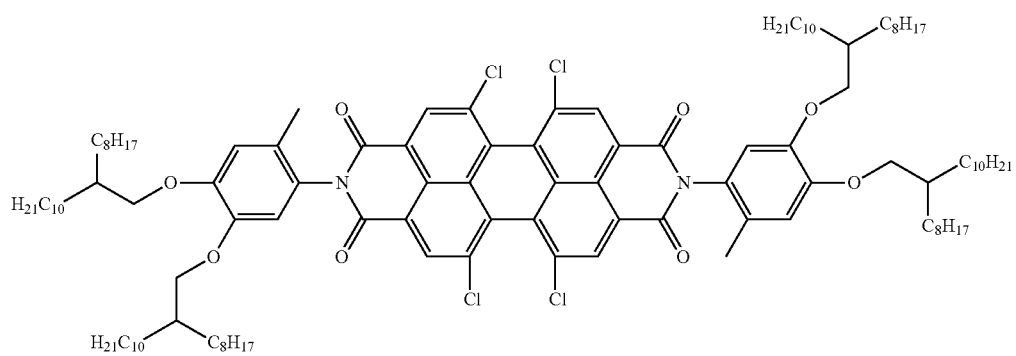
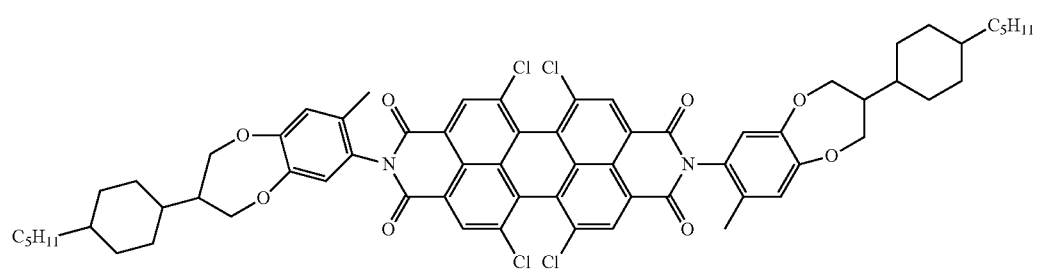
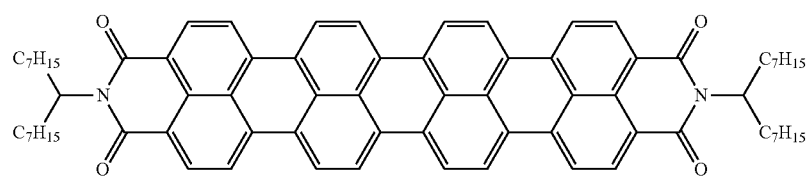

-continued
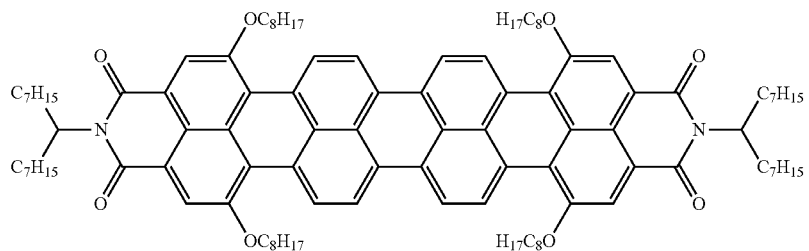
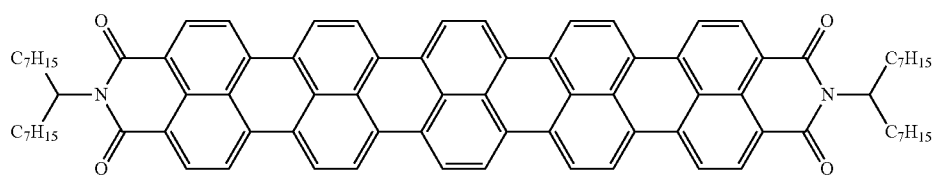
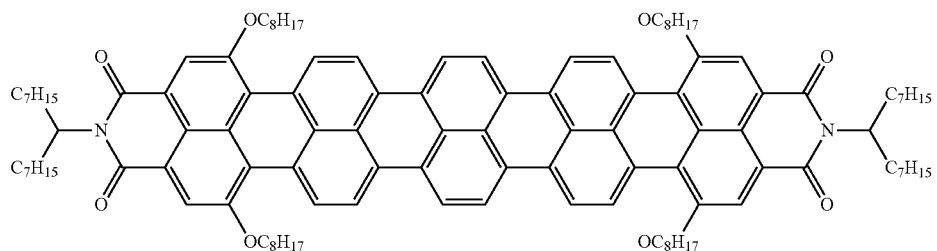
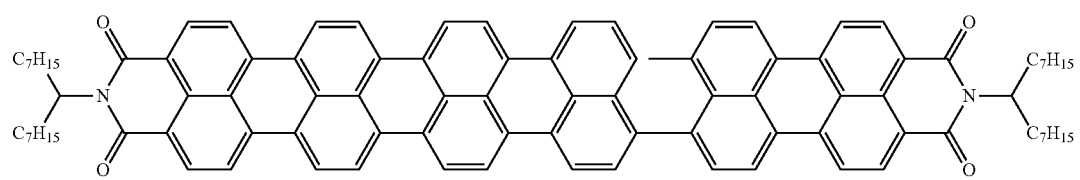
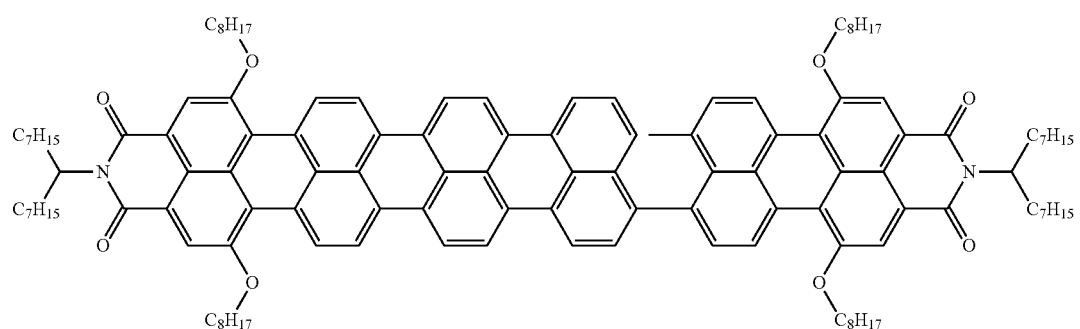
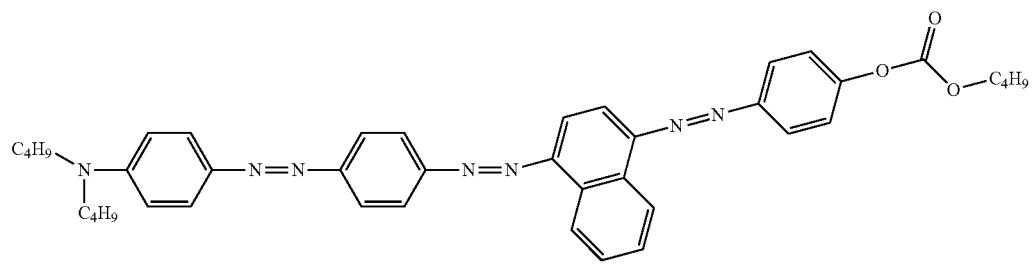

-continued
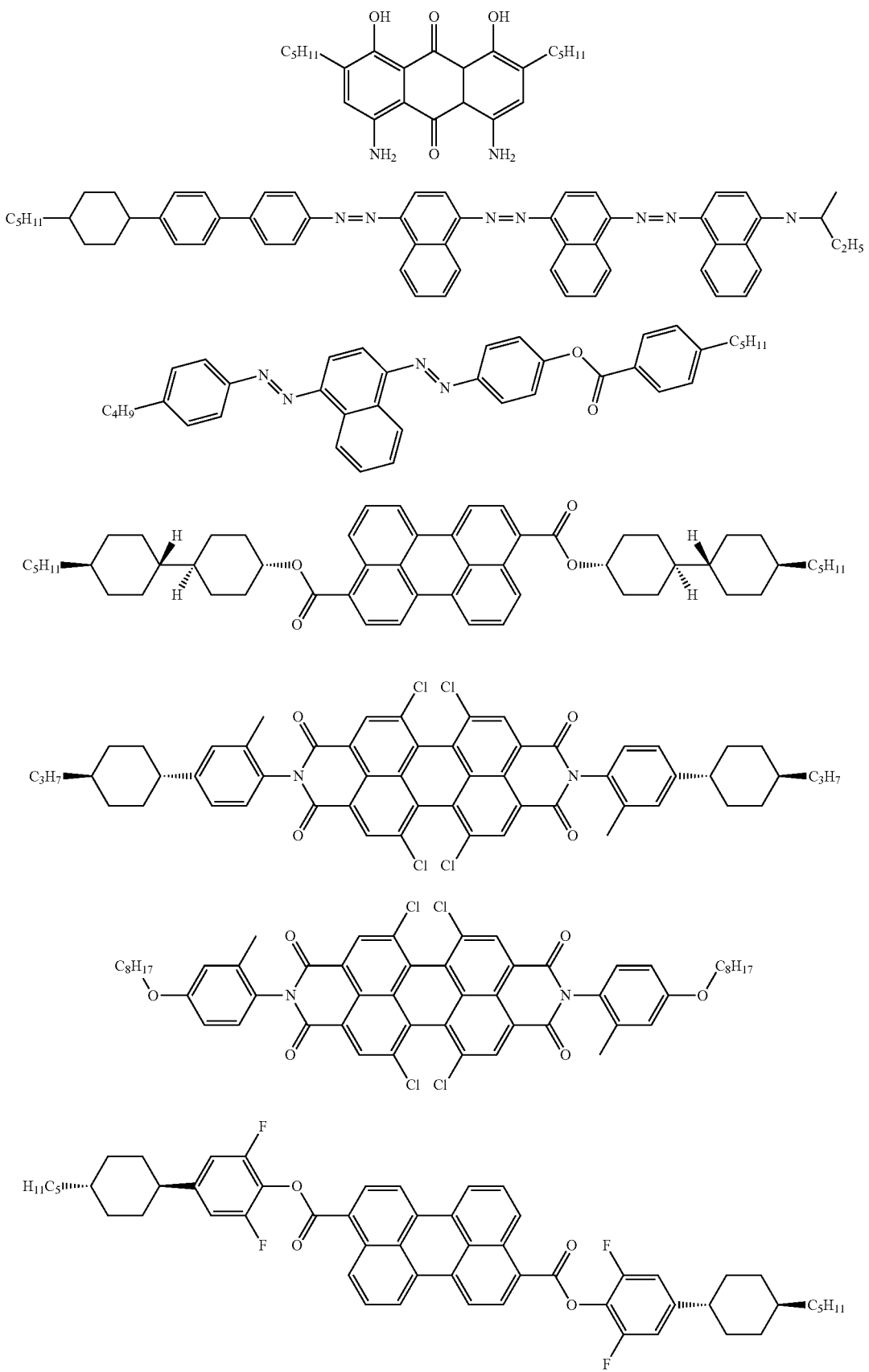

-continued
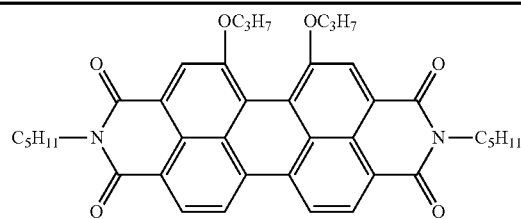
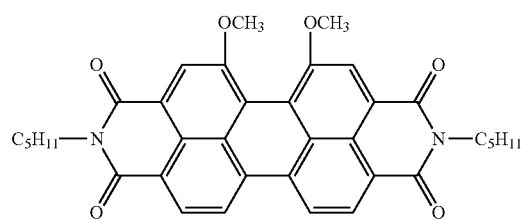
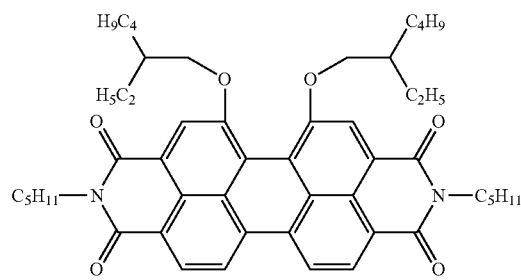
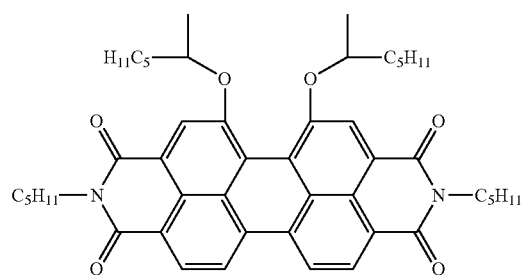
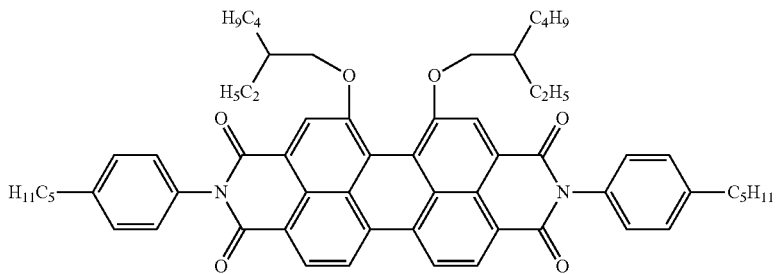
It is particularly preferred for the three following dyes:
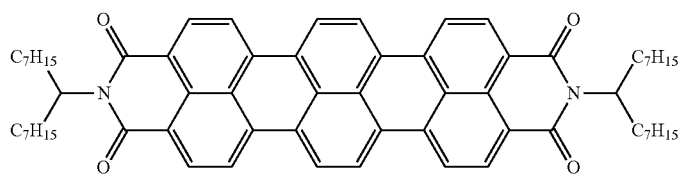

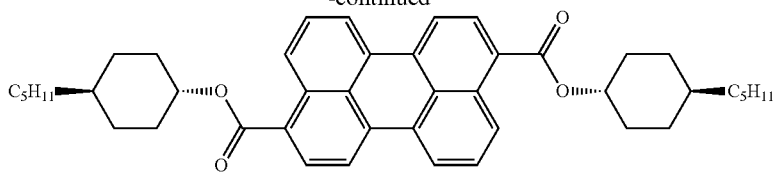
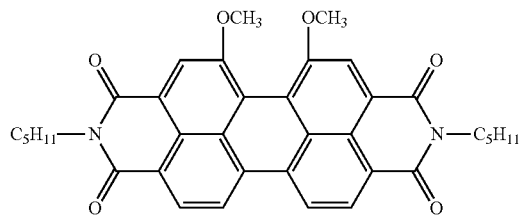
to be employed in combination with one another in the liquid-crystalline medium according to the invention.
It is alternatively preferred for the three following dyes:
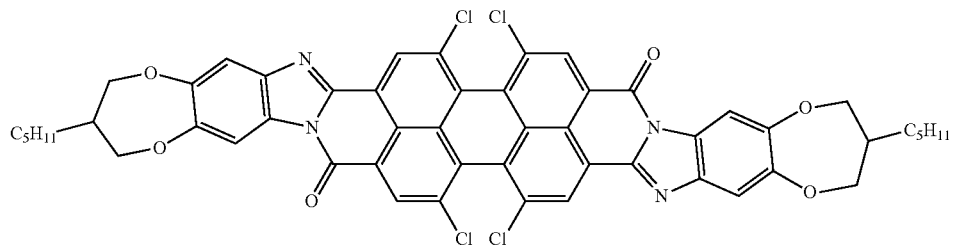
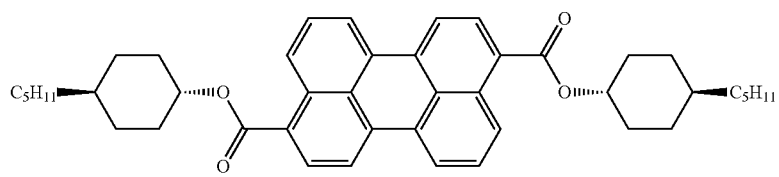
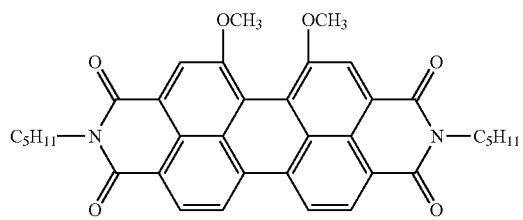
to be employed in combination with one another in the liquid-crystalline medium according to the invention.
It is alternatively preferred for the three following dyes:
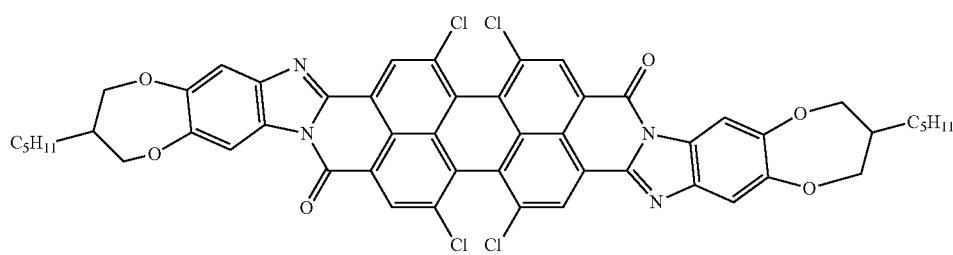

-continued

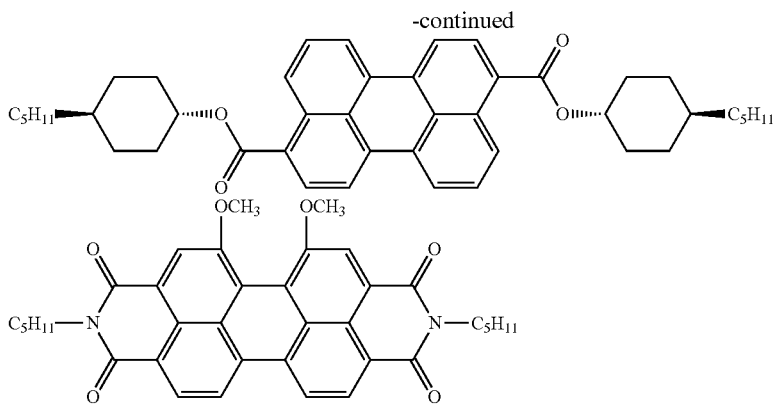

to be employed in combination with one another in the liquid-crystalline medium according to the invention.

In the above-mentioned cases, further dyes may be present in the liquid-crystalline medium, or the dyes indicated above may be the only dyes in the liquid-crystalline medium according to the invention.

The liquid-crystalline medium according to the invention is preferably prepared by firstly mixing the compounds of the formulae (I), (II) and (III) and optionally further components, but without the dichroic dye. The dichroic dye is subsequently added and dissolved, preferably at a temperature higher than room temperature, particularly preferably at greater than 40° C., very particularly preferably at greater than 50° C.

The present invention likewise relates to the said process for the preparation of the liquid-crystalline medium according to the invention.

The invention furthermore relates to the use of a liquid-crystalline medium comprising at least one compound of the formula (I) as defined above, at least one compound of the formula (II) as defined above and at least one compound of the formula (III) as defined above in an LC device of the guest-host type.

The preferred embodiments of the compounds (I) to (III) are likewise regarded as preferred here, as are the other preferred embodiments indicated above in connection with the liquid-crystalline medium according to the invention.

The invention furthermore relates to an LC device of the guest-host type, containing a liquid-crystalline medium which comprises at least one compound of the formula (I), at least one compound of the formula (II) and at least one compound of the formula (III), where the compounds are as defined above wie oben definiert sind.

The LC device of the guest-host type is explained in greater detail below.

It represents a switchable device which contains a switchable layer comprising the liquid-crystalline medium according to the invention. Switching of the device here is taken to mean a change in the light transmission of the device. This can be utilised for the display of information (display device, display) or for the regulation of the passage of energy through the device, preferably the passage of light (switchable window, energy-saving window).

The LC device of the guest-host type is preferably electrically switchable. However, it may also be thermally switchable, as described, for example, in WO 2010/118422. In this case, the switching preferably takes place through a transition from a nematic state to an isotropic state through a change in the temperature of the switchable layer comprising the liquid-crystalline medium according to the invention. In the nematic state, the molecules of the liquid-crystalline medium are in ordered form, and thus so are the dichroic compounds, for example aligned parallel to the surface of the device due to the action of an alignment layer. In the isotropic state, the molecules are in unordered form, and thus so are the dichroic dyes. The difference between ordered and unordered presence of the dichroic dyes causes a difference in the light transmission of the LC device of the guest-host type, in accordance with the principle explained above that dichroic dye molecules have a higher or lower absorption coefficient depending on the alignment with respect to the plane of vibration of light.

If the device is electrically switchable, it preferably includes two or more electrodes which are attached to both sides of the layer comprising the liquid-crystalline medium. The electrodes are preferably provided with electrical connections. The voltage is preferably provided by a battery, an accumulator or by external power supply.

The switching operation in the case of electrical switching takes place through an alignment of the molecules of the liquid-crystalline medium by the application of voltage. In a preferred embodiment, the device is con-verted from a state of high absorption, i.e. low light transmission, which is present without voltage, into a state of lower absorption, i.e. higher light transmission. The liquid-crystalline medium is preferably nematic in both states. The voltage-free state is preferably characterised in that the molecules of the liquid-crystalline medium, and thus the dichroic dyes, are aligned parallel to the surface of the device. This is preferably achieved by an alignment layer. The state under voltage is preferably characterised in that the molecules of the liquid-crystalline medium, and thus the dichroic dyes, are perpendicular to the surface of the device.

According to a preferred embodiment of the invention, the LC device of the guest-host type can be operated without external power supply by providing the requisite energy by a solar cell or another device for the conversion of light and/or heat energy into electrical energy. The provision of the energy by the solar cell can take place directly or indirectly, i.e. via an intermediate battery or accumulator or other unit for the storage of energy. The solar cell is preferably mounted externally on the device or it is an internal constituent of the LC device of the guest-host type, as disclosed, for example, in WO 2009/141295. Particular preference is given here to solar cells, which are particularly efficient in the case of diffuse light, and transparent solar cells. Organic solar cells can be used in the devices according to the invention.

The device furthermore preferably comprises one or more, particularly preferably two, alignment layers. The function of the alignment layer and the electrode may coincide in one layer, for example in a polyimide layer. The alignment layers are preferably polyimide layers, particularly preferably layers comprising rubbed polyimide. Rubbed polyimide results in a preferential alignment of the liquid-crystalline compounds in the rubbing direction if the compounds are planar to the alignment layer.

The switchable layer is furthermore preferably arranged between two substrate layers or surrounded thereby in the LC device of the guest-host type. The substrate layers may consist, for example, of glass or a polymer, preferably a light-transmitting polymer.

According to one preferable embodiment, the LC device of the guest-host type contains no polarisers.

According to an alternative preferable embodiment, the LC device of the guest-host type contains one or more polarisers. These are preferably linear polarisers. Preferably, precisely one polariser or precisely two polarisers are present. If one or more polarisers are present, these are preferably arranged parallel to the surface of the device.

If precisely one polariser is present, its absorption direction is preferably perpendicular to the preferential alignment of the liquid-crystalline compounds of the liquid-crystalline medium of the LC device on the side of the polariser.

In the case where precisely two polarisers are present, it is preferred for a so-called dye-doped TN mode to be present. In this case, the preferential alignment of the liquid-crystalline compounds of the liquid-crystalline medium in the LC device on both sides of the layer comprising the medium is twisted with respect to one another, preferably by an angle of about 90°. In this case, the absorption direction of the polarisers is furthermore preferably in each case parallel to the preferential alignment of the liquid-crystalline compounds in the LC device on the side of the respective polariser.

In the LC device of the guest-host type, both absorptive and also reflective polarisers can be employed. Preference is given to the use of polarisers which are in the form of thin optical films. Preference is furthermore given to the use of linear polarisers. Examples of reflective polarisers which can be used in the device according to the invention are DRPF (diffusive reflective polariser film, 3M), DBEF (dual brightness enhanced film, 3M), DBR (layered-polymer distributed Bragg reflectors, as described in U.S. Pat. Nos. 7,038,745 and 6,099,758) and APF films (advanced polariser film, 3M, cf. Technical Digest SID 2006, 45.1, US 2011/0043732 and U.S. Pat. No. 7,023,602). It is furthermore possible to employ polarisers based on wire grids (WGPs, wire-grid polarisers) which reflect infrared light. Examples of absorptive polarisers which can be employed in the devices according to the invention are the Itos XP38 polariser film and the Nitto Denko GU-1220DUN polariser film. An example of a circular polariser which can be used in accordance with the invention is the APNCP37-035-STD polariser (American Polarizers). A further example is the CP42 polariser (ITOS).

The LC device of the guest-host type furthermore preferably contains a light-guide system, preferably as described in WO 2009/141295. The light-guide system collects and concentrates light which hits the device. It preferably collects and concentrates light which is emitted by fluorescent dichroic dyes in the switchable layer comprising the liquid-crystalline medium. The light-guide system is in contact with a device for the conversion of light energy into electrical energy, preferably a solar cell, so that the collected light hits this in concentrated form. In a preferred embodiment of the invention, the device for the conversion of light energy into electrical energy is mounted on the edge of the device, integrated therein and electrically connected to the device for the electrical switching of the LC device of the guest-host type.

The LC device of the guest-host type can preferably be used as a display. Specific embodiments of such devices have been described many times in the prior art, cf. B. Bahadur, Liquid Crystals—Applications and Uses, Vol. 3, 1992, World Scientific Publishing, Section 11.

However, it can likewise preferably be used as a device for the regulation of the passage of energy through a light-transmitting area. In this case, the device is preferably designed in its outer structure as described in WO 2009/141295 and WO 2010/118422. Furthermore, it is in this case used primarily for the regulation of the temperature of an interior space, preferably an interior space of a building.

Furthermore, the device can also be employed for aesthetic room design, for example for light and colour effects. For example, door and wall elem-ents comprising the LC device of the guest-host type according to the invention in grey or in colour can be switched to transparent. Furthermore, the device may also contain white or coloured full-area backlighting, which is modulated in luminance, or yellow full-area backlighting, which is modulated in colour by means of a blue guest-host display. Further aesthetic effects can also be generated with the aid of light sources shining in from the side, such as white or coloured LEDs or LED chains in combination with the device according to the invention. In this case, one or both glass sides of the device according to the invention can be provided with rough-ened or structured glass for the coupling-out of light and/or for the genera-tion of light effects.

According to a preferred embodiment of the invention, the LC device of the guest-host type is a constituent of a window or a similar light-transmitting opening. The window or opening is preferably located in a building. However, it can also be located in the wall of any desired other closed space, for example in a container or a vehicle.

WORKING EXAMPLES

The following examples illustrate the present invention and are not to be interpreted as restrictive.

In the present application, structures of liquid-crystalline compounds are reproduced by abbreviations (acronyms). These abbreviations are explicitly presented and explained in WO 2012/052100 (pp. 63-89), so that refer-ence is made to the said published application for an explanation of the abbreviations in the present application.

The following liquid-crystalline media (mixtures Example 1 to Example 11 according to the invention and comparative mixtures V-1 to V-3) are pre-pared by mixing the components indicated. The parameters clearing point, $\Delta n$, $n_e$, $n_o$, the solubility of various dyes, the stability of the solutions and the degree of anisotropy of the dye in the liquid-crystalline medium in question are determined for the mixtures and indicated below.

All physical properties are determined in accordance with "Merck Liquid Crystals, Physical Properties of Liquid Crystals", Status Nov. 1997, Merck KGaA, Germany, and apply for a temperature of 20° C. The value of $\Delta n$ is determined at 589 nm, and the value of $\Delta\varepsilon$ is determined at 1 kHz, unless explicitly stated otherwise in each case. $n_e$ and $n_o$ are in each case the refractive indices of the extraordinary and ordinary light beam under the conditions indicated above.

The degree of anisotropy R is determined from the value for the extinction coefficient E(p) (extinction coefficient of the mixture in the case of parallel alignment of the molecules to the polarisation direction of the light) and the value for the extinction coefficient of the mixture E(s) (extinction coefficient of the mixture in the case of perpendicular alignment of the molecules to the polarisation direction of the light), in each case at the wavelength of the maximum of the absorption band of the dye in question. If the dye has a plurality of absorption bands, the longest-wave absorption band is selected. The alignment of the molecules of the mixture is achieved by an alignment layer, as known to the person skilled in the art in the area of LC display technology. In order to eliminate influences by liquid-crystalline medium, other absorptions and/or reflections, each measurement is carried out against an identical mixture comprising no dye, and the value obtained is subtracted.

The measurement is carried out using linear-polarised light whose vibration direction is either parallel to the alignment direction (determination of E(p)) or perpendicular to the alignment direction (determination of E(s)). This can be achieved by a linear polariser, where the polariser is rotated with respect to the device in order to achieve the two different vibration direc-tions. The measurement of E(p) and E(s) is thus carried out via the rotation of the vibration direction of the incident polarised light. Alternatively, the sample can also be rotated against a spatially fixed polarisation direction of the incident polarised light.

The degree of anisotropy R is calculated from the resultant values for E(s) and E(p) in accordance with the formula $$R=[E(p)-E(s)]/[E(p)+2*E(s)],$$

as indicated, inter alia, in "Polarized Light in Optics and Spectroscopy", D. S. Kliger et al., Academic Press, 1990. A detailed description of the method for the determination of the degree of anisotropy of liquid-crystalline media comprising a dichroic dye is also given in B. Bahadur, Liquid Crystals—Applications and Uses, Vol. 3, 1992, World Scientific Publishing, Section 11.4.2.

In order to determine the low-temperature stability of the liquid-crystalline media according to the invention, dye D-1 (cf. following table of dyes) is dissolved in the medium in question in an amount of 0.25% by weight. The medium is subsequently stored at a temperature of −20° C., −30° C. and −40° C. (in each case one of three identical samples at each of the three temperatures mentioned) and checked visually for the occurrence of crystals or similar changes. The time up to which no change is observed in any of the three samples is quoted as the low-temperature stability (in days).

Mixtures Example 1 to Example 11 according to the invention are:

TABLE 1

|  | Example 1 |  | Example 2 |  |
|---|---|---|---|---|
| Clearing point | 114.5° C. |  | 113° C. |  |
| Δ n | 0.1342 |  | 0.1393 |  |
| $n_e$ | 1.6293 |  | 1.6345 |  |
| $n_o$ | 1.4951 |  | 1.4952 |  |
| Low-temperature stability (in days) | 41 |  | 63 |  |
| Composition | Compound | % | Compound | % |
|  | CPG-3-F | 5 | CPG-3-F | 5 |
|  | CPG-5-F | 5 | CPG-5-F | 5 |
|  | CPU-3-F | 15 | CPU-3-F | 12 |
|  | CPU-5-F | 15 | CPU-5-F | 12 |
|  | CP-3-N | 16 | CP-3-N | 16 |
|  | CP-5-N | 16 | CP-5-N | 16 |
|  | CCGU-3-F | 7 | CCGU-3-F | 7 |
|  | CGPC-3-3 | 4 | CPGU-3--OT | 4 |
|  | CGPC-5-3 | 4 | CCZPC-3-3 | 4 |
|  | CGPC-5-5 | 4 | CCZPC-3-4 | 4 |
|  | CCZPC-3-3 | 3 | CCZPC-3-5 | 3 |
|  | CCZPC-3-4 | 3 | CPZG-3-N | 4 |
|  | CCZPC-3-5 | 3 | CPZG-4-N | 4 |
|  |  |  | CPZG-5-N | 4 |

TABLE 2

|  | Example 3 |  | Example 4 |  |
|---|---|---|---|---|
| Clearing point | 110.5° C. |  | 110.0° C. |  |
| Low-temperature stability (in days) | 37 |  | 45 |  |
| Composition | Compound | % | Compound | % |
|  | CPU-3-F | 20 | CPU-3-F | 20 |
|  | CPU-5-F | 20 | CPU-5-F | 20 |
|  | CP-3-N | 16 | CCU-3-F | 5 |
|  | CP-5-N | 16 | CP-3-N | 16 |
|  | CCGU-3-F | 7 | CP-5-N | 15 |
|  | CGPC-3-3 | 4 | CGPC-3-3 | 4 |
|  | CGPC-5-3 | 4 | CGPC-5-3 | 4 |
|  | CGPC-5-5 | 4 | CGPC-5-5 | 4 |
|  | CCZPC-3-3 | 3 | CCZPC-3-3 | 4 |
|  | CCZPC-3-4 | 3 | CCZPC-3-4 | 3 |
|  | CCZPC-3-5 | 3 | CCZPC-3-5 | 3 |
|  |  |  | CPPC-3-3 | 2 |

TABLE 3

|  | Example 5 |  | Example 6 |  |
|---|---|---|---|---|
| Clearing point | 109.0° C. |  | 112.0° C. |  |
| Low-temperature stability (in days) | 40 |  | 39 |  |
| Composition | Compound | % | Compound | % |
|  | CPU-3-F | 8 | CPU-2-F | 6 |
|  | CPU-5-F | 20 | CPU-3-F | 8 |
|  | CCU-3-F | 8 | CPU-5-F | 15 |
|  | CCG-V-F | 11 | CPU-7-F | 17 |
|  | CP-3-N | 16 | CP-3-N | 14 |
|  | CP-5-N | 15 | CP-5-N | 15 |
|  | CGPC-3-3 | 4 | CGPC-3-3 | 4 |
|  | CGPC-5-3 | 4 | CGPC-5-3 | 4 |
|  | CGPC-5-5 | 4 | CGPC-5-5 | 4 |
|  | CCZPC-3-3 | 4 | CCZPC-3-3 | 4 |
|  | CCZPC-3-4 | 3 | CCZPC-3-4 | 4 |
|  | CCZPC-3-5 | 3 | CCZPC-3-5 | 4 |
|  |  |  | CPPC-3-3 | 1 |

TABLE 4

|  | Example 7 |  | Example 8 |  |
|---|---|---|---|---|
| Clearing point | 116.0° C. |  | 112.0° C. |  |
| Low-temperature stability (in days) | 55 |  | 36 |  |
| Composition | Compound | % | Compound | % |
|  | CPU-5-F | 15 | CPU-3-F | 15 |
|  | CPU-7-F | 17 | CPU-5-F | 15 |
|  | CP-3-N | 18 | CP-3-N | 13 |
|  | CP-5-N | 15 | CP-5-N | 12 |
|  | CP-1V-N | 7 | CP-1V-N | 5 |

TABLE 4-continued

| Compound | % | Compound | % |
|---|---|---|---|
| CGPC-3-3 | 4 | CG-3-N | 5 |
| CGPC-5-3 | 4 | CU-3-N | 5 |
| CGPC-5-5 | 4 | CGPC-3-3 | 4 |
| CCZPC-3-3 | 3 | CGPC-5-3 | 4 |
| CCZPC-3-4 | 3 | CGPC-5-5 | 4 |
| CCZPC-3-5 | 2 | CCZPC-3-3 | 3 |
| CPPC-3-3 | 2 | CCZPC-3-4 | 3 |
| CPGP-4-3 | 3 | CCZPC-3-5 | 2 |
| CPGP-5-2 | 3 | CPPC-3-3 | 4 |
|  |  | CPGP-4-3 | 3 |
|  |  | CPGP-5-2 | 3 |

TABLE 5

|  | Example 9 | Example 10 |
|---|---|---|
| Clearing point | 111.0° C. | 110.0° C. |
| Low-temperature stability (in days) | 45 | 57 |

| Composition | Compound | % | Compound | % |
|---|---|---|---|---|
|  | CPU-3-F | 10 | CPU-3-F | 10 |
|  | CPU-5-F | 13 | CPU-5-F | 13 |
|  | CPG-3-F | 5 | CPG-3-F | 5 |
|  | CPG-5-F | 7 | CPG-5-F | 7 |
|  | CP-3-N | 13 | CP-3-N | 15 |
|  | CP-5-N | 12 | CP-1V-N | 9 |
|  | CP-1V-N | 9 | CP-V2-N | 10 |
|  | CG-3-N | 5 | CG-1V-N | 5 |
|  | CGPC-3-3 | 4 | CGPC-3-3 | 4 |
|  | CGPC-5-3 | 4 | CGPC-5-3 | 4 |
|  | CGPC-5-5 | 4 | CGPC-5-5 | 4 |
|  | CCZPC-3-3 | 4 | CCZPC-3-3 | 4 |
|  | CPPC-3-3 | 4 | CPPC-3-3 | 4 |
|  | CPPC-3-3 | 4 | CPPC-3-3 | 4 |
|  | CPGP-4-3 | 3 | CPGP-4-3 | 3 |
|  | CPGP-5-2 | 3 | CPGP-5-2 | 3 |

TABLE 6

|  | Example 11 |
|---|---|
| Clearing point | 113.0° C. |
| Low-temperature stability (in days) | 67 |

| Composition | Compound | % |
|---|---|---|
|  | CPU-3-F | 12 |
|  | CPU-5-F | 15 |
|  | CPG-3-F | 3 |
|  | CPG-5-F | 5 |
|  | CP-3-N | 15 |
|  | CP-5-N | 10 |
|  | CP-1V-N | 6 |
|  | CGPC-3-3 | 4 |
|  | CGPC-5-3 | 3 |
|  | CGPC-5-5 | 3 |
|  | CPPC-3-3 | 4 |
|  | CPZIC-3-4 | 8 |
|  | CCZP-3-3 | 5 |
|  | CPZP-3-3 | 5 |
|  | CCZGI-3-3 | 2 |

Comparative mixtures V-1, V-2 and V-3 are:

TABLE 7

|  | Comparative Example V1 | Comparative Example V2 |
|---|---|---|
| Clearing point | 77.5° C. | 110° C. |
| Δ n | 0.1255 | 0.1234 |
| $n_e$ | 1.6230 | 1.6150 |
| $n_o$ | 1.4975 | 1.4916 |
| Low-temperature stability (in days) | 13 | 3 |

| Composition | Compound | % | Compound | % |
|---|---|---|---|---|
|  | PZG-2-N | 0.94 | CP-3-N | 18 |
|  | PZG-3-N | 0.94 | CP-4-N | 12 |
|  | PZG-5-N | 2.18 | CP-5-N | 21 |
|  | CP-3-O1 | 7.49 | CP-3-O1 | 13 |
|  | CC-3-4 | 3.12 | CPPC-3-3 | 3 |
|  | CPP-3-2 | 2.50 | CPPC-5-3 | 3 |
|  | CCZGI-3-3 | 2.50 | CPPC-5-5 | 3 |
|  | CCZGI-3-5 | 2.50 | CGPC-3-3 | 3 |
|  | CCZPC-3-5 | 0.94 | CGPC-5-3 | 3 |
|  | CPZG-3-N | 1.25 | CGPC-5-5 | 3 |
|  | CGPC-3-3 | 1.25 | CCZGI-3-3 | 4 |
|  | PZG-4-N | 2.18 | CCZGI-3-5 | 5 |
|  | CCZPC-3-4 | 1.25 | CCZPC-3-3 | 3 |
|  | CGPC-5-3 | 0.94 | CCZPC-3-4 | 3 |
|  | CCZPC-3-3 | 1.25 | CCZPC-3-5 | 3 |
|  | CPU-3-F | 34.40 |  |  |
|  | CPU-5-F | 34.40 |  |  |

TABLE 8

|  | Comparative Example V3 |
|---|---|
| Clearing point | 115.5° C. |
| Low-temperature stability (in days) | 6 |

| Composition | Compound | % |
|---|---|---|
|  | CPG-2-F | 3 |
|  | CPG-3-F | 4 |
|  | CPG-5-F | 4 |
|  | CPU-3-F | 4 |
|  | CPU-5-F | 4 |
|  | CCU-2-F | 4 |
|  | CCU-3-F | 4 |
|  | CCU-5-F | 4 |
|  | CCGU-3-F | 5 |
|  | CP-3-O1 | 12 |
|  | CP-3-O2 | 18 |
|  | CGPC-3-3 | 3 |
|  | CGPC-5-3 | 3 |
|  | CGPC-5-5 | 3 |
|  | CCZPC-3-3 | 3 |
|  | CCZPC-3-4 | 3 |
|  | CCZPC-3-5 | 3 |
|  | CCP-2-OT | 4 |
|  | CCP-3-OT | 4 |
|  | CCP-4-OT | 4 |
|  | CCP-5-OT | 4 |

The above examples show that the mixtures according to the invention have a high clearing point and good solubility of dichroic dye D-1. Furthermore, the mixtures according to the invention have very good stability of the solution of the dye at low temperatures (cf. description of the conditions above, duration 37 to 63 days).

Results for comparative mixtures which have a mixture concept disclosed in the prior art are discussed below: V-1 and V-3 are mixtures in accordance with the prior art which comprise polyfluorinated tricyclic compounds, but no cyanophenyl compounds. By contrast, V-2 is a mixture in accordance with the prior art which comprises cyanophenyl compounds, but no fluorinated tricyclic compounds.

Comparative mixtures V-1 to V-3 have poorer values for the stability of the solution of the dichroic dye in the mixture (3 or 6 or 13 days respectively) than the mixtures according to the invention. Although mixture V-1 has a less poor value for the solution stability than V-2 and V-3, it has, however, the disadvantage of a very low clearing point (77.5° C.).

Furthermore, the solubility of various dyes and their degree of anisotropy are determined for Mixture Example 1 according to the invention. The results are listed in the following table.

The dyes in the mixture according to the invention have good values for the solubility and the degree of anisotropy.

Solubility of dichroic dyes in Mixture Example 1:

TABLE 9

| Dye | Degree of anisotropy R | Solubility in % by weight |
|---|---|---|
| D-1 | 0.5 | 0.25 |
| D-2 | 0.77 | 0.5 |

TABLE 9-continued

| Dye | Degree of anisotropy R | Solubility in % by weight |
|---|---|---|
| D-3 | 0.64 | 0.5 |
| D-4 | 0.6 | 0.15 |
| D-5 | 0.68 | 0.50 |
| D-6 | 0.76 | 0.70 |
| D-7 | 0.54 | 0.25 |
| D-8 | 0.76 | 0.5 |
| D-9 | 0.81 | 0.30 |
| D-10 | 0.83 | 0.25 |
| D-11 | 0.82 | 0.25 |
| D-12 | 0.59 | 0.13 |

The compounds used are:

TABLE 10

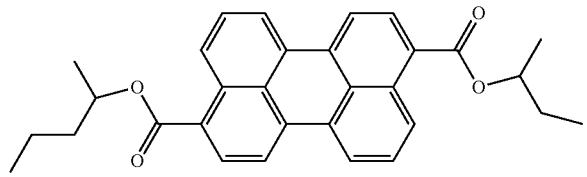 [SMILES: CCCC(C)OC(=O)c1ccc2c3cccc4c(C(=O)OC(C)CC)ccc(c5cccc1c52)c43]

D-1

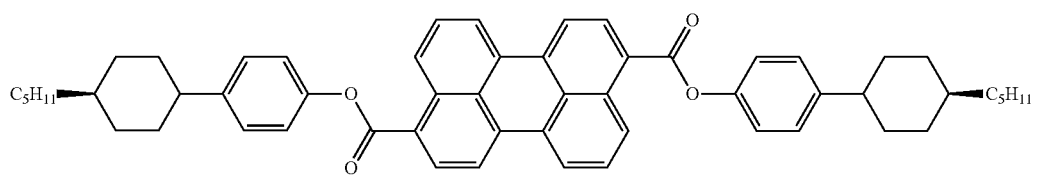

D-2

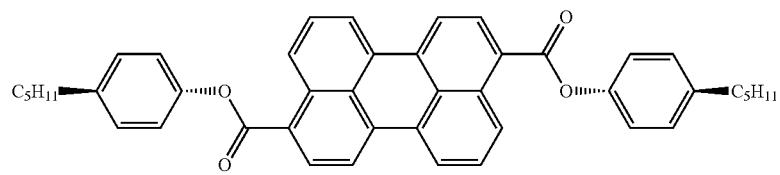

D-3

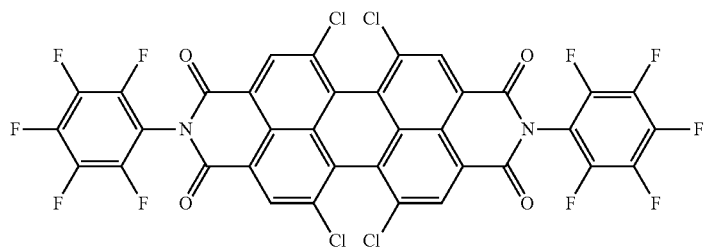 [SMILES: O=C1c2cc(Cl)c3c4c(Cl)cc5c6c(cc(Cl)c(c7c(Cl)cc(c2c37)C(=O)N1c1c(F)c(F)c(F)c(F)c1F)c64)C(=O)N(c1c(F)c(F)c(F)c(F)c1F)C5=O]

D-4

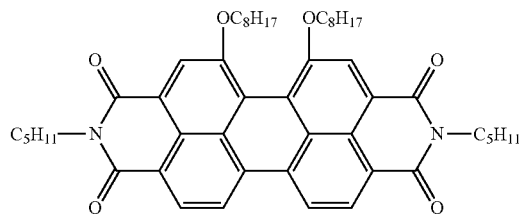

D-5

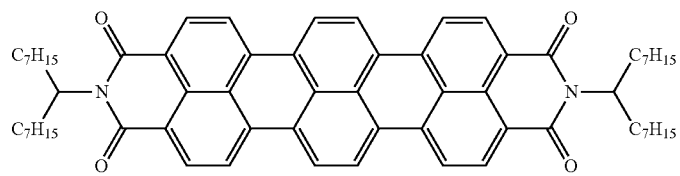

D-6

TABLE 10-continued
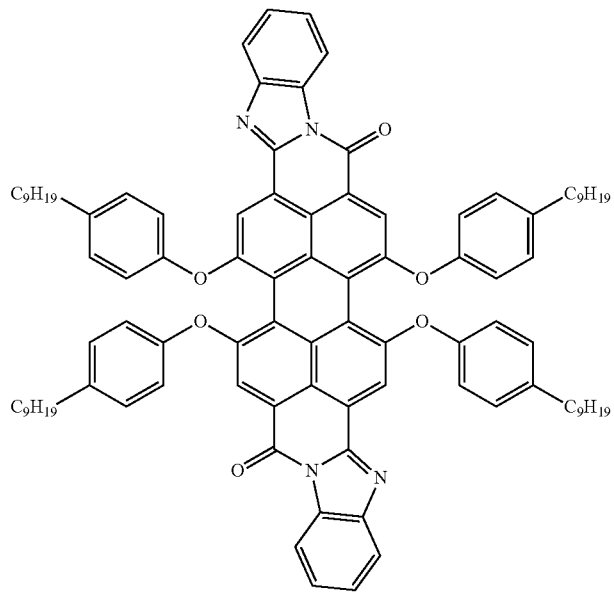
D-7
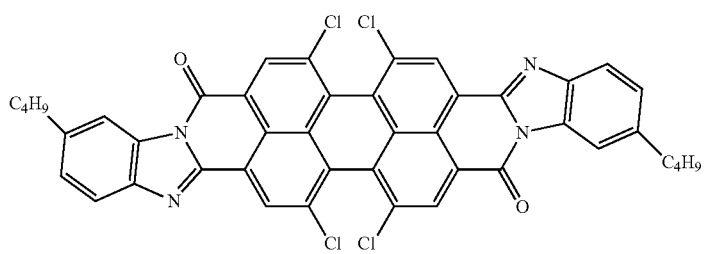
D-8
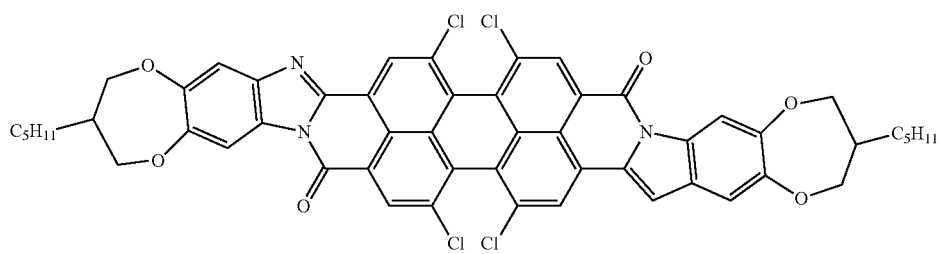
D-9
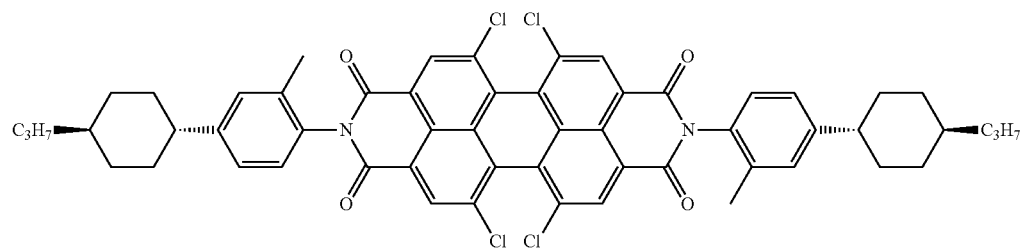
D-10
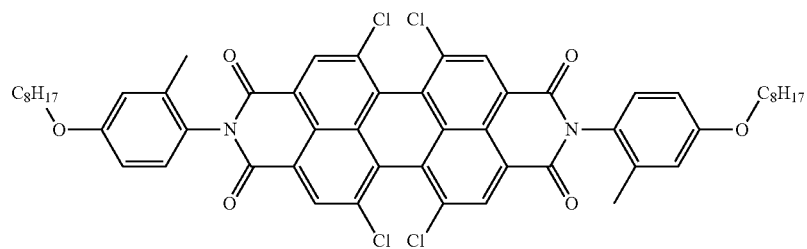
D-11

TABLE 10-continued

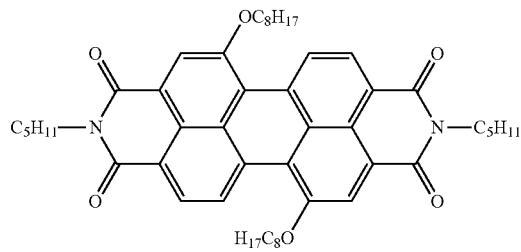

D-12

The invention claimed is:

1. A window which regulates the passage of energy which comprises an electrically switchable LC device of the guest-host type, containing a liquid-crystalline medium in a switching layer, wherein the liquid-crystalline medium comprises:

at least one compound of a formula (I-1):

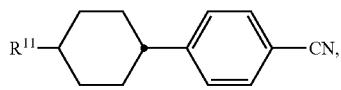

where $R^{11}$ is selected from H, F, CN, or an alkyl or alkoxy group having 1 to 10 C atoms, where one or more H atoms in alkyl or alkoxy groups are optionally replaced by F, Cl or CN;

at least one compound of a formula (II-1):

where $A^{22}$ is selected from

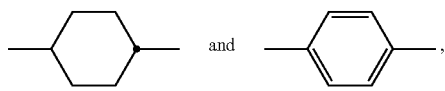

and $A^{23}$ is selected from

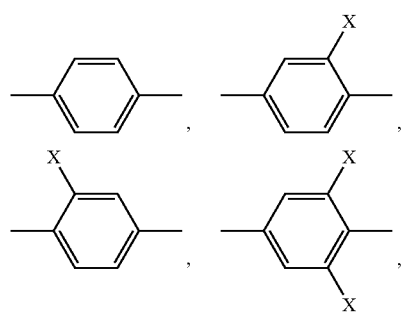

-continued

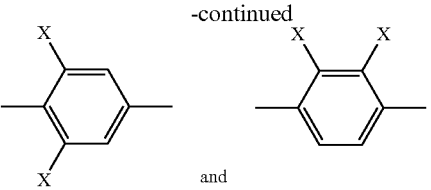

and ;

at least one compound of a formula (III):

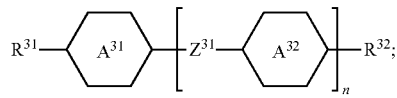

and at least three different dichroic dyes,
where
$R^{21}$, $R^{22}$, $R^{31}$, $R^{32}$ are on each occurrence, identically or differently, H, F, Cl, CN, NCS, $R^1$—O—CO—, $R^1$—CO—O—, an alkyl, alkoxy or thioalkoxy group having 1 to 10 C atoms, or an alkenyl, alkenyloxy or thioalkenyloxy group having 2 to 10 C atoms, where one or more H atoms in the above-mentioned groups may be replaced by F, Cl or CN, and where one or more $CH_2$ groups in the above-mentioned groups may be replaced by O, S, —O—CO— or —CO—O—,
$R^1$ is on each occurrence, identically or differently, an alkyl group having 1 to 10 C atoms, in which one or more hydrogen atoms may be replaced by F or Cl, and in which one or more $CH_2$ groups may be replaced by O or S,
$Z^{31}$ is selected on each occurrence, identically or differently, from —CO—O—, —O—CO—, —$CF_2$—$CF_2$—, —$CF_2$—O—, —O—$CF_2$—, —$CH_2$—$CH_2$—, —CH=CH—, —CF=CF—, —CF=CH—, —CH=CF—, —C≡C—, —$OCH_2$—, —$CH_2$O— and a single bond,
$A^{31}$, $A^{32}$ are selected on each occurrence, identically or differently, from

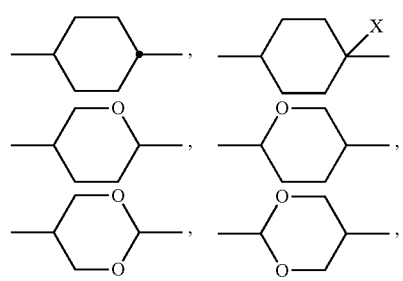

-continued

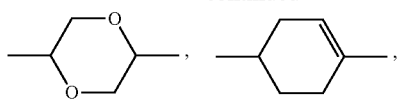
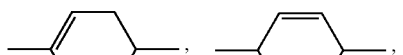
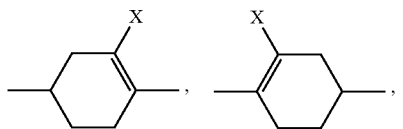
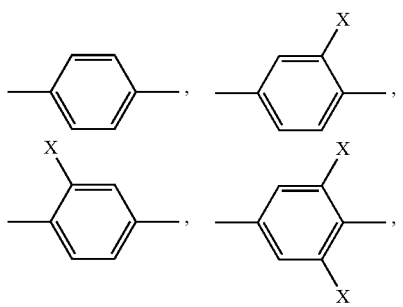
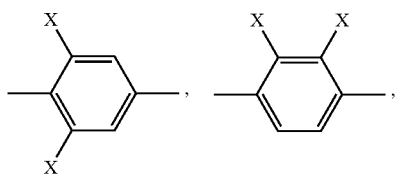
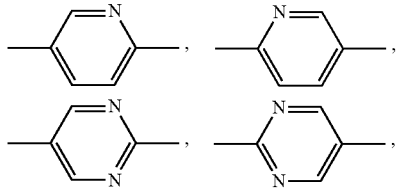
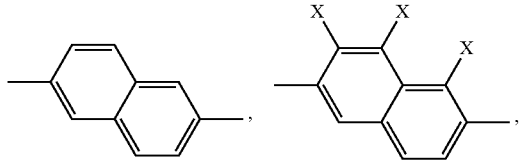
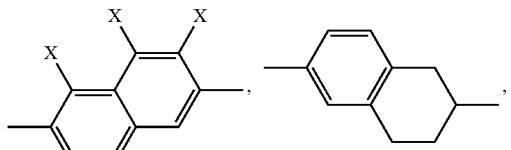
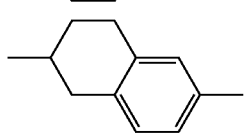
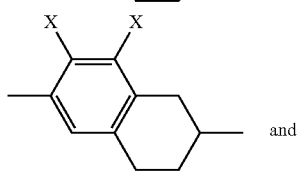

-continued

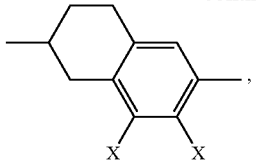

X is selected on each occurrence, identically or differently, from F, Cl, CN or an alkyl, alkoxy or alkylthio group having 1 to 10 C atoms, where one or more hydrogen atoms in the above-mentioned groups may be replaced by F or Cl, and where one or more $CH_2$ groups in the above-mentioned groups may be replaced by O or S, and n is 3, 4 or 5; and where the compound of the formula (II-1) carries at least two fluorine substituents;

where the medium contains 30-50% by weight of the at least one compound of the formula (II-1) and 15-45% by weight of compounds of the formula (III); and where the medium has a clearing point greater than 100° C.

2. A window according to claim 1, wherein the liquid crystalline medium therein comprises 10-60% by weight of compounds of the formula (I-1).

3. A window according to claim 1, where, in the liquid crystalline medium, the ratio of the proportions of compounds of the formula (I-1) to compounds of the formula (II-1) is between 1:0.9 and 1:5.

4. A window according to claim 1, wherein the liquid crystalline medium has a dielectric anisotropy greater than 3.

5. A window according to claim 1, where, in the liquid crystalline medium, the group $A^{23}$ is

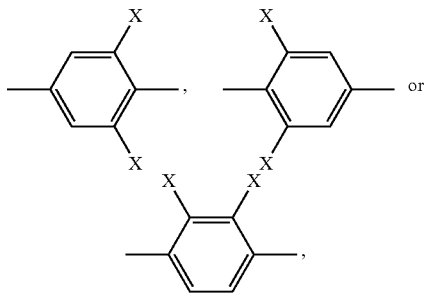

wherein both groups X are F.

6. A window according to claim 1, where, in the liquid crystalline medium, the value n in the compound of the formula (III) is equal to 3.

7. A window according to claim 1, where, in the liquid crystalline medium, the at least three dichroic dyes comprise at least one dichroic dye which absorbs blue light, at least one dichroic dye which absorbs green to yellow light, and at least one dichroic dye which absorbs red light.

8. A window according to claim 1, where, in the liquid crystalline medium, at least one dichroic dye has a degree of anisotropy R of greater than 0.4.

9. A window according to claim 1, where, in the liquid crystalline medium, at least one dichroic dye is a fluorescent dye.

10. A window according to claim 1, where, in the liquid crystalline medium, the dichroic dyes are selected from azo compounds, anthraquinones, methine compounds, azomethine compounds, merocyanine compounds, naphthoquinones, tetrazines, perylenes, terrylenes, quaterrylenes, higher rylenes and pyrromethenes.

11. Process for the preparation of the window according to claim 1, comprising first mixing the compounds of the formulae (I-1), (II-1) and (III) and optionally further components, without the dichroic dyes, and subsequently adding and dissolving the dichroic dyes.

* * * * *